United States Patent
Wang et al.

(10) Patent No.: US 11,825,125 B2
(45) Date of Patent: Nov. 21, 2023

(54) SIGNALING OF GENERAL CONSTRAIN INFORMATION

(71) Applicant: Bytedance Inc., Los Angeles, CA (US)

(72) Inventors: Ye-kui Wang, San Diego, CA (US); Li Zhang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/073,700

(22) Filed: Dec. 2, 2022

(65) Prior Publication Data

US 2023/0122189 A1    Apr. 20, 2023

Related U.S. Application Data

(63) Continuation of application No. PCT/US2021/035366, filed on Jun. 2, 2021.

(60) Provisional application No. 63/033,689, filed on Jun. 2, 2020.

(51) Int. Cl.
  *H04N 19/70*  (2014.01)
  *H04N 19/85*  (2014.01)
  *H04N 19/30*  (2014.01)
  *H04N 19/172*  (2014.01)

(52) U.S. Cl.
  CPC ............ *H04N 19/70* (2014.11); *H04N 19/85* (2014.11)

(58) Field of Classification Search
  None
  See application file for complete search history.

(56) References Cited

U.S. PATENT DOCUMENTS

| | | |
|---|---|---|
| 2016/0065982 A1 | 3/2016 | Cho et al. |
| 2016/0234516 A1 | 8/2016 | Hendry et al. |
| 2021/0368208 A1* | 11/2021 | Samuelsson ........... H04N 19/46 |

FOREIGN PATENT DOCUMENTS

WO    2020058567 A1    3/2020

OTHER PUBLICATIONS

Document: JVET-S0050-v3, Deng, Z., et al., "AHG9: On general constraints information," Joint Video Experts Team (JVET) of ITU-T SG 16 WP 3 and ISO/IEC JTC 1/SC 29/WG 11 19th Meeting: by teleconference, Jun. 22-Jul. 1, 2020, 9 pages.
Document: JVET-S0127, Coban, M., et al., "AHG9: On general constraint info signalling," Joint Video Experts Team (JVET) of ITU-T SG 16 WP 3 and ISO/IEC JTC 1/SC 29/WG 11 19th Meeting: by teleconference, Jun. 22-Jul. 1, 2020, 3 pages.
Document: JVET-S0092, Samuelsson, J., et al., "On constraint info signalling," Joint Video Experts Team (JVET) of ITU-T SG 16 WP 3 and ISO/IEC JTC 1/SC 29/WG 11 19th Meeting: by teleconference, Jun. 22-Jul. 1, 2020, 3 pages.

(Continued)

*Primary Examiner* — Christopher Braniff
(74) *Attorney, Agent, or Firm* — Conley Rose, P.C.

(57) ABSTRACT

Methods, systems, and devices for signaling of general constraint information are described. An example method of video processing includes performing a conversion between a video including one or more pictures and a bitstream of the video according to a rule. The rule specifies that a syntax structure in a profile-tier-level syntax structure is after a syntax element. The syntax structure includes information related to general constraint information (GCI) for the bitstream. The syntax element indicates a level to which an output layer set associated with the profile-tier-level syntax structure conforms.

20 Claims, 15 Drawing Sheets

(56) References Cited

OTHER PUBLICATIONS

"Series H: Audiovisual and Multimedia Systems Infrastructure of audiovisual services—Coding of moving video High efficiency video coding," Recommendation ITU-T H.265, ISO/IEC 23008-2 (in force edition), Nov. 2019, 712 pages.

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 apges.

Document: JVET-R2001-vB, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 530 pages.

Document: JVET-S0152-v3, Wang, Y., "AHG2: Editorial input of a text integration for the May 2020 HLS AHG meeting outcome," Joint Video Experts Team (JVET) of ITU-T SG 16 WP 3 and ISO/IEC JTC 1/SC 29/WG 11 19th Meeting: by teleconference, Jun. 22-Jul. 1, 2020, 5 pages.

Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Bossen, F., et al., VTM software, Retrieved from the internet: https://vcgit.hhi.fraunhofer.de/jvet/VVCSoftware_VTM.git, Feb. 27, 2023, 3 pages.

Foreign Communication From a Counterpart Application, PCT Application No. PCT/US2021/035366, International Search Report dated Sep. 9, 2021, 14 pages.

Foreign Communication From a Counterpart Application, PCT Application No. PCT/US2021/035370, International Search Report dated Sep. 9, 2021, 14 pages.

Document: JVET-R0108-v2, Deshpande, S., et al., "AHG9: On Decoding Capability Information and PTL Signalling," Joint Video Experts Team (JVET) of ITU-T SG 16 WP 3 and ISO/IEC JTC 1/SC 29/WG 11 18th Meeting: by teleconference, Apr. 15-24, 2020, 4 pages.

Document: JVET-S0050-v2, Deng., Z., et al., "AHG9: On general constraints information," Joint Video Experts Team (JVET) of ITU-T SG 16 WP 3 and ISO/IEC JTC 1/SC 29/WG 11 19th Meeting: by teleconference, Jun. 22-Jul. 1, 2020, 9 pages.

Document: JVET-S0179-v1, Wang, Y., et al., "AHG9: On conditional signalling of GCI fields," Joint Video Experts Team (JVET) of ITU-T SG 16 WP 3 and ISO/IEC JTC 1/SC 29/WG 11 19th Meeting: by teleconference, Jun. 22-Jul. 1, 2020, 4 pages.

Foreign Communication From A Related Counterpart Application, European Application No. 21817377.1, Extended European Search Report dated Jun. 30, 2023, 12 pages.

* cited by examiner

SIGNALING OF GENERAL CONSTRAIN INFORMATION

CROSS-REFERENCE TO RELATED APPLICATION

This application is a continuation of International Patent Application No. PCT/US2021/035366 filed on Jun. 2, 2021, which claims the priority to and benefits of U.S. Provisional Patent Application No. 63/033,689 filed on Jun. 2, 2020. All the aforementioned patent applications are hereby incorporated by reference in their entireties.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses techniques for the signaling of general constraint information (GCI) that can be used by video encoders and decoders to perform video encoding, decoding, or processing.

In one example aspect, a video processing method is disclosed. The method includes performing a conversion between a video comprising one or more pictures and a bitstream of the video according to a rule, wherein the rule specifies that a syntax structure in a profile-tier-level syntax structure is after a syntax element, wherein the syntax structure comprises information related to general constraint information (GCI) for the bitstream, and wherein the syntax element indicates a level to which an output layer set associated with the profile-tier-level syntax structure conforms.

In another example aspect, another video processing method is disclosed. The method includes performing a conversion between a video comprising one or more pictures and a bitstream of the video according to a rule, wherein the rule specifies that a byte alignment syntax in a general constraint information (GCI) syntax structure is after one or more GCI reserved fields, wherein the byte alignment syntax indicates whether a current position in the bitstream is an integer multiple of 8 bits from a position of a first bit in the bitstream, and wherein the GCI syntax structure comprises GCI related syntax elements.

In yet another example aspect, another video processing method is disclosed. The method includes performing a conversion between a video comprising one or more pictures and a bitstream of the video according to a rule, wherein the rule specifies that a syntax structure in a profile-tier-level syntax structure is after an indication of level information, wherein the syntax structure comprises information related to general constraint information (GCI), and wherein the indication of level information specifies an interoperability indicator.

In yet another example aspect, another video processing method is disclosed. The method includes performing a conversion between a video comprising one or more pictures and a bitstream of the video according to a rule, wherein rule specifies that a syntax element in a profile-tier-level syntax structure indicates whether a general constraint information (GCI) syntax structure is included in the profile-tier-level syntax structure.

In yet another example aspect, another video processing method is disclosed. The method includes performing a conversion between a video comprising one or more pictures and a bitstream of the video according to a rule, wherein the rule specifies that a byte alignment syntax is excluded from a general constraint information (GCI) syntax structure that is present in the profile-tier-level syntax structure, wherein the byte alignment syntax indicates whether a current position in the bitstream is an integer multiple of 8 bits from a position of a first bit in the bitstream, and wherein the GCI syntax structure comprises a GCI related syntax element.

In yet another example aspect, another video processing method is disclosed. The method includes performing a conversion between a video comprising one or more pictures and a bitstream of the video according to a rule, wherein the rule specifies that a general constraint information (GCI) syntax structure is immediately before a byte alignment checking condition in a profile-tier-level syntax structure, wherein the GCI syntax structure comprises GCI related syntax elements, and wherein the byte alignment checking condition checks whether a current position in the bitstream is an integer multiple of 8 bits from a position of a first bit in the bitstream.

In yet another example aspect, another video processing method is disclosed. The method includes performing a conversion between a video comprising one or more pictures and a bitstream of the video according to a rule, wherein the rule specifies that a number of a plurality of reserved constraint bits associated with a general constraint information (GCI) syntax element is included in the bitstream.

In yet another example aspect, another video processing method is disclosed. The method includes performing a conversion between a video comprising one or more pictures and a bitstream of the video according to a rule, wherein the rule specifies that a general constraint information (GCI) syntax element is included at a beginning of a GCI syntax structure, wherein the GCI syntax element indicates whether one or more GCI syntax elements are included in the GCI syntax structure.

In yet another example aspect, another video processing method is disclosed. The method includes performing a conversion between a video comprising one or more pictures and a bitstream of the video according to a rule, wherein the rule specifies a constraint on a syntax element, wherein the syntax element corresponds to a bit depth used for representing the video in the bitstream.

In yet another example aspect, another video processing method is disclosed. The method includes performing a conversion between a video comprising one or more pictures and a bitstream of the video according to a rule, wherein the rule specifies a constraint on a syntax element, wherein the syntax element corresponds to a chroma format of the video.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present disclosure.

DETAILED DESCRIPTION

Figure 1:
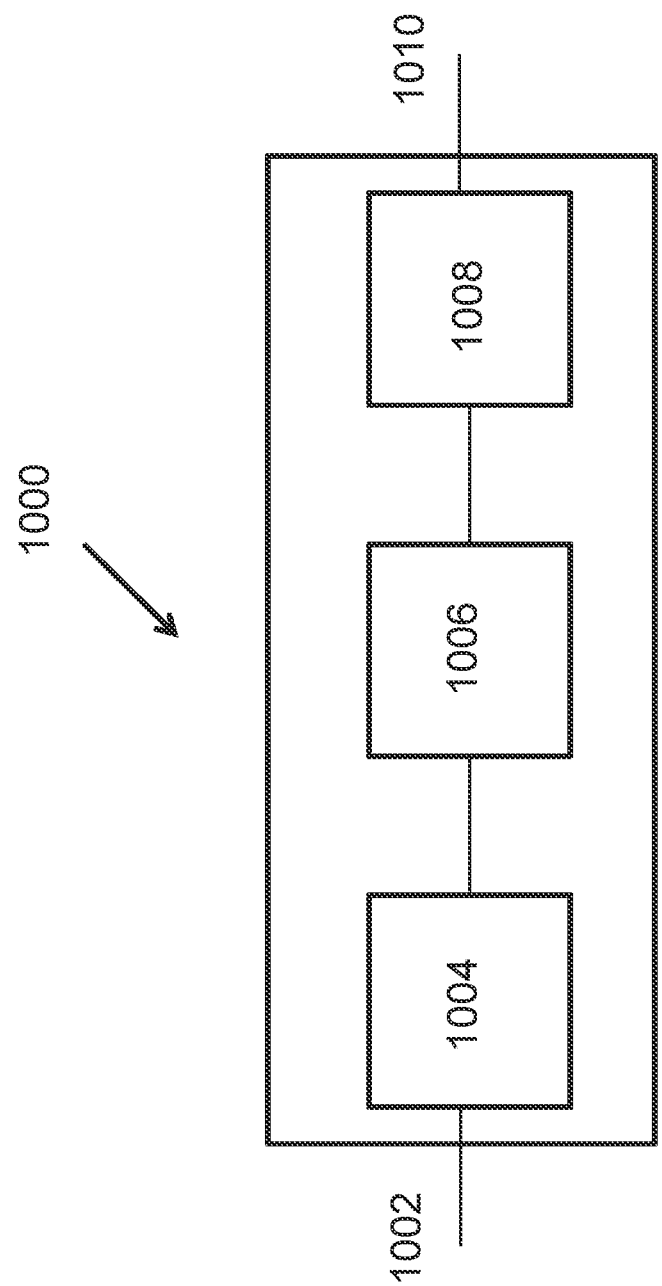
FIG. 1 is a block diagram showing an example video processing system in which various techniques disclosed herein may be implemented.

Section headings are used in the present disclosure for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Introduction

This disclosure is related to video coding technologies. Specifically, it is about syntax designs for signaling of general constraints information (GCI) in video coding. The ideas may be applied individually or in various combination, to any video coding standard or non-standard video codec that supports multi-layer video coding, e.g., the being-developed Versatile Video Coding (VVC).

2. Abbreviations

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DCI Decoder Capability Information
DPB Decoded Picture Buffer
DPS Decoding Parameter Set
EOB End Of Bitstream
EOS End Of Sequence
GCI General Constraints Information
GDR Gradual Decoding Refresh
HEVC High Efficiency Video Coding
HRD Hypothetical Reference Decoder
IDR Instantaneous Decoding Refresh
TRAP Intra Random Access Point
JEM Joint Exploration Model
MCTS Motion-Constrained Tile Sets
NAL Network Abstraction Layer
NUT NAL Unit Type
OLS Output Layer Set
PH Picture Header
PPS Picture Parameter Set
PTL Profile, Tier and Level
PU Picture Unit
RADL Random Access Decodable Leading
RRP Reference Picture Resampling
RBSP Raw Byte Sequence Payload
SEI Supplemental Enhancement Information
SH Slice Header
SPS Sequence Parameter Set
SVC Scalable Video Coding
VCL Video Coding Layer
VPS Video Parameter Set
VTM VVC Test Model
VUI Video Usability Information
VVC Versatile Video Coding

3. Initial Discussion

Video coding standards have evolved primarily through the development of the well-known International Telecommunication Union—Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Picture Resolution Change within a Sequence

In AVC and HEVC, the spatial resolution of pictures cannot change unless a new sequence using a new SPS starts, with an TRAP picture. VVC enables picture resolution change within a sequence at a position without encoding an TRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be larger than or equal to ½ (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from ½ to 1/1.75, from 1/1.75 to 1/1.25, and from 1/1.25 to 8. Each set of resampling filters has 16 phases for luma and 32 phases for chroma which is same to the case of motion compensation interpolation filters. Actually the normal motion compensation (MC) interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) The picture resolution and the corresponding conformance window are signaled in the PPS instead of in the SPS, while in the SPS the maximum picture resolution is signaled. ii) For a single-layer bitstream, each picture store (a slot in the DPB for storage of one decoded picture) occupies the buffer size as required for storing a decoded picture having the maximum picture resolution.

3.2. Scalable Video Coding (SVC) in General and in VVC

Scalable video coding (SVC, sometimes also just referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or three dimensional (3D) extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VP S), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. E.g., the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the high level syntax (HLS) aspects have been significantly simplified at the sacrifice of some flexibilities. For example, an IRAP AU is required to contain a picture for each of the layers present in the CVS.

3.3. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signaling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.4. General Profile, Tier, and Level Syntax and Semantics

In the latest VVC draft text, the general profile, tier, level syntax and semantics are as follows:

|  | Descriptor |
|---|---|
| profile_tier_level( profileTierPresentFlag, maxNumSubLayersMinus1 ) { | |
|   if( profileTierPresentFlag ) { | |
|     general_profile_idc | u(7) |
|     general_tier_flag | u(1) |
|     general_constraint_info( ) | |
|   } | |
|   general_level_idc | u(8) |
|   if( profileTierPresentFlag ) { | |
|     ptl_num_sub_profiles | u(8) |
|     for( i = 0; i < ptl_num_sub_profiles; i++ ) | |
|       general_sub_profile_idc[ i ] | u(32) |
|   } | |
|   for( i = 0; i < maxNumSubLayersMinus1; i++ ) | |

| Descriptor |
|---|
| ptl_sublayer_level_present_flag[ i ]     u(1)
while( !byte_aligned( ) )
    ptl_alignment_zero_bit     f(1)
for( i = 0; i < maxNumSubLayersMinus1; i++ )
    if( ptl_sublayer_level_present_flag[ i ] )
        sublayer_level_idc[ i ]     u(8)
} |

A profile_tier_level( ) syntax structure provides level information and, optionally, profile, tier, sub-profile, and general constraints information.

When the profile_tier_level( ) syntax structure is included in a VPS, the OlsInScope is one or more OLSs specified by the VPS. When the profile_tier_level( ) syntax structure is included in an SPS, the OlsInScope is the OLS that includes only the layer that is the lowest layer among the layers that refer to the SPS, and this lowest layer is an independent layer.

general_profile_idc indicates a profile to which OlsInScope conforms as specified in Annex A. Bitstreams shall not contain values of general_profile_idc other than those specified in Annex A. Other values of general_profile_idc are reserved for future use by ITU-T|ISO/IEC.

general_tier_flag specifies the tier context for the interpretation of general_level_idc as specified in Annex A.

general_level_idc indicates a level to which OlsInScope conforms as specified in Annex A. Bitstreams shall not contain values of general_level_idc other than those specified in Annex A. Other values of general_level_idc are reserved for future use by ITU-T|ISO/IEC.

NOTE 1—A greater value of general_level_idc indicates a higher level. The maximum level signalled in the DCI NAL unit for OlsInScope may be higher than but cannot be lower than the level signalled in the SPS for a CLVS contained within OlsInScope.

NOTE 2—When OlsInScope conforms to multiple profiles, general_profile_idc should indicate the profile that provides the preferred decoded result or the preferred bitstream identification, as determined by the encoder (in a manner not specified in this Specification).

NOTE 3—When the CVSs of OlsInScope conform to different profiles, multiple profile_tier_level( ) syntax structures may be included in the DCI NAL unit such that for each CVS of the OlsInScope there is at least one set of indicated profile, tier, and level for a decoder that is capable of decoding the CVS.

ptl_num_sub_profiles specifies the number of the general_sub_profile_idc[i] syntax elements.

general_sub_profile_idc[i] specifies the indicator of the i-th interoperability metadata registered as specified by Rec. ITU-T T.35, the contents of which are not specified in this Specification.

ptl_sublayer_level_present_flag[i] equal to 1 specifies that level information is present in the profile_tier_level( ) syntax structure for the sublayer representation with TemporalId equal to i. ptl_sublayer_level_present_flag[i] equal to 0 specifies that level information is not present in the profile_tier_level( ) syntax structure for the sublayer representation with TemporalId equal to i.

ptl_alignment_zero_bits shall be equal to 0.

The semantics of the syntax element sublayer_level_idc[i] is, apart from the specification of the inference of not present values, the same as the syntax element general_level_idc, but apply to the sublayer representation with TemporalId equal to i.

When not present, the value of sublayer_level_idc[i] is inferred as follows:
  sublayer_level_idc[maxNumSubLayersMinus1] is inferred to be equal to general_level_idc of the same profile_tier_level( ) structure,
  For i from maxNumSubLayersMinus1−1 to 0 (in decreasing order of values of i), inclusive, sublayer_level_idc[i] is inferred to be equal to sublayer_level_idc[i+1].

3.5. General Constraint Information Syntax and Semantics

| | Descriptor |
|---|---|
| general_constraint_info( ) { | |
| general_non_packed_constraint_flag | u(1) |
| general_frame_only_constraint_flag | u(1) |
| general_non_projected_constraint_flag | u(1) |
| general_one_picture_only_constraint_flag | u(1) |
| intra_only_constraint_flag | u(1) |
| max_bitdepth_minus8_constraint_idc | u(4) |
| max_chroma_format_constraint_idc | u(2) |
| single_layer_constraint_flag | u(1) |
| all_layers_independent_constraint_flag | u(1) |
| no_ref_pic_resampling_constraint_flag | u(1) |
| no_res_change_in_clvs_constraint_flag | u(1) |
| one_tile_per_pic_constraint_flag | u(1) |
| pic_header_in_slice_header_constraint_flag | u(1) |
| one_slice_per_pic_constraint_flag | u(1) |
| one_subpic_per_pic_constraint_flag | u(1) |
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_ccalf_constraint_flag | u(1) |
| no_joint_cbcr_constraint_flag | u(1) |
| no_mrl_constraint_flag | u(1) |
| no_isp_constraint_flag | u(1) |
| no_mip_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_lfnst_constraint_flag | u(1) |
| no_affine_motion_constraint_flag | u(1) |
| no_mmvd_constraint_flag | u(1) |
| no_smvd_constraint_flag | u(1) |
| no_prof_constraint_flag | u(1) |
| no_bcw_constraint_flag | u(1) |
| no_ibc_constraint_flag | u(1) |
| no_ciip_constraint_flag | u(1) |
| no_gpm_constraint_flag | u(1) |
| no_ladf_constraint_flag | u(1) |
| no_transform_skip_constraint_flag | u(1) |
| no_bdpcm_constraint_flag | u(1) |
| no_weighted_prediction_constraint_flag | u(1) |
| no_palette_constraint_flag | u(1) |
| no_act_constraint_flag | u(1) |
| no_lmcs_constraint_flag | u(1) |
| no_cu_qp_delta_constraint_flag | u(1) |
| no_chroma_qp_offset_constraint_flag | u(1) |
| no_dep_quant_constraint_flag | u(1) |
| no_sign_data_hiding_constraint_flag | u(1) |
| no_mixed_nalu_types_in_pic_constraint_flag | u(1) |
| no_trail_constraint_flag | u(1) |
| no_stsa_constraint_flag | u(1) |
| no_rasl_constraint_flag | u(1) |
| no_radl_constraint_flag | u(1) |
| no_idr_constraint_flag | u(1) |
| no_cra_constraint_flag | u(1) |
| no_gdr_constraint_flag | u(1) |
| no_aps_constraint_flag | u(1) |

| | Descriptor |
|---|---|
| while( !byte_aligned( ) ) | |
|     gci_alignment_zero_bit | f(1) |
| gci_num_reserved_bytes | u(8) |
| for( i = 0; i < gci_num_reserved_bytes; i++ ) | |
|     gci_reserved_byte[ i ] | u(8) |
| } | | general_non_packed_constraint_flag equal to 1 specifies that there shall not be any frame packing arrangement SEI messages present in the bitstream of the OlsInScope. general_non_packed_constraint_flag equal to 0 does not impose such a constraint.

NOTE 1—Decoders may ignore the value of general_non_packed_constraint_flag, as there are no decoding process requirements associated with the presence or interpretation of frame packing arrangement SEI messages.

general_frame_only_constraint_flag equal to 1 specifies that OlsInScope conveys pictures that represent frames. general_frame_only_constraint_flag equal to 0 specifies that OlsInScope conveys pictures that may or may not represent frames.

NOTE 2—Decoders may ignore the value of general_frame_only_constraint_flag, as there are no decoding process requirements associated with it.

general_non_projected_constraint_flag equal to 1 specifies that there shall not be any equirectangular projection SEI messages or generalized cubemap projection SEI messages present in the bitstream of the OlsInScope. general_non_projected_constraint_flag equal to 0 does not impose such a constraint.

NOTE 3—Decoders may ignore the value of general_non_projected_constraint_flag, as there are no decoding process requirements associated with the presence or interpretation of equirectangular projection SEI messages and generalized cubemap projection SEI messages.

general_one_picture_only_constraint_flag equal to 1 specifies that there is only one coded picture in the bitstream. general_one_picture_only_constraint_flag equal to 0 does not impose such a constraint.

intra_only_constraint_flag equal to 1 specifies that sh_slice_type shall be equal to I. intra_only_constraint_flag equal to 0 does not impose such a constraint.

max_bitdepth_minus8_constraint_idc specifies that sps_bitdepth_minus8 shall be in the range of 0 to max_bitdepth_minus8_constraint_idc, inclusive.

max_chroma_format_constraint_idc specifies that sps_chroma_format_idc shall be in the range of 0 to max_chroma_format_constraint_idc, inclusive.

single_layer_constraint_flag equal to 1 specifies that the value of nuh_layer_id shall be the same for all VCL NAL units in OlsInScope. single_layer_constraint_flag equal to 0 does not impose such a constraint.

all_layers_independent_constraint_flag equal to 1 specifies that vps_all_independent_layers_flag shall be equal to 1. all_layers_independent_constraint_flag equal to 0 does not impose such a constraint.

no_ref_pic_resampling_constraint_flag equal to 1 specifies that sps_ref_pic_resampling_enabled_flag shall be equal to 0. no_ref_pic_resampling_constraint_flag equal to 0 does not impose such a constraint.

no_res_change_in_clvs_constraint_flag equal to 1 specifies that sps_res_change_in_clvs_allowed_flag shall be equal to 0. no_res_change_in_clvs_constraint_flag equal to 0 does not impose such a constraint.

one_tile_per_pic_constraint_flag equal to 1 specifies that each picture shall contain only one tile, i.e., the value of NumTilesInPic for each picture shall be equal to 1. one_tile_per_pic_constraint_flag equal to 0 does not impose such a constraint.

pic_header_in_slice_header_constraint_flag equal to 1 specifies that each picture shall contain only one slice and the value of sh_picture_header_in_slice_header_flag in each slice shall be equal to 1. pic_header_in_slice_header_constraint_flag equal to 0 does not impose such a constraint.

one_slice_per_pic_constraint_flag equal to 1 specifies that each picture shall contain only one slice, i.e., if pps_rect_slice_flag is equal to 1, the value of num_slices_in_pic_minus1 shall be equal to 0, otherwise, the value of num_tiles_in_slice_minus1 present in each slice header shall be equal to NumTilesInPic−1. one_slice_per_pic_constraint_flag equal to 0 does not impose such a constraint.

one_subpic_per_pic_constraint_flag equal to 1 specifies that each picture shall contain only one subpicture, i.e., the value of sps_num_subpics_minus1 for each picture shall be equal to 0. one_subpic_per_pic_constraint_flag equal to 0 does not impose such a constraint.

no_qtbtt_dual_tree_intra_constraint_flag equal to 1 specifies that sps_qtbtt_dual_tree_intra_flag shall be equal to 0. no_qtbtt_dual_tree_intra_constraint_flag equal to 0 does not impose such a constraint.

no_partition_constraints_override_constraint_flag equal to 1 specifies that sps_partition_constraints_override_enabled_flag shall be equal to 0. no_partition_constraints_override_constraint_flag equal to 0 does not impose such a constraint.

no_sao_constraint_flag equal to 1 specifies that sps_sao_enabled_flag shall be equal to 0. no_sao_constraint_flag equal to 0 does not impose such a constraint.

no_alf_constraint_flag equal to 1 specifies that sps_alf_enabled_flag shall be equal to 0. no_alf_constraint_flag equal to 0 does not impose such a constraint.

no_ccalf_constraint_flag equal to 1 specifies that sps_ccalf_enabled_flag shall be equal to 0. no_ccalf_constraint_flag equal to 0 does not impose such a constraint.

no_joint_cbcr_constraint_flag equal to 1 specifies that sps_joint_cbcr_enabled_flag shall be equal to 0. no_joint_cbcr_constraint_flag equal to 0 does not impose such a constraint.

no_mrl_constraint_flag equal to 1 specifies that sps_mrl_enabled_flag shall be equal to 0. no_mrl_constraint_flag equal to 0 does not impose such a constraint.

no_isp_constraint_flag equal to 1 specifies that sps_isp_enabled_flag shall be equal to 0. no_isp_constraint_flag equal to 0 does not impose such a constraint.

no_mip_constraint_flag equal to 1 specifies that sps_mip_enabled_flag shall be equal to 0. no_mip_constraint_flag equal to 0 does not impose such a constraint.

no_ref_wraparound_constraint_flag equal to 1 specifies that sps_ref_wraparound_enabled_flag shall be equal to 0. no_ref_wraparound_constraint_flag equal to 0 does not impose such a constraint.

no_temporal_mvp_constraint_flag equal to 1 specifies that sps_temporal_mvp_enabled_flag shall be equal to 0. no_temporal_mvp_constraint_flag equal to 0 does not impose such a constraint.

no_sbtmvp_constraint_flag equal to 1 specifies that sps_sbtmvp_enabled_flag shall be equal to 0. no_sbtmvp_constraint_flag equal to 0 does not impose such a constraint.

no_amvr_constraint_flag equal to 1 specifies that sps_amvr_enabled_flag shall be equal to 0. no_amvr_constraint_flag equal to 0 does not impose such a constraint.

no_bdof_constraint_flag equal to 1 specifies that sps_bdof_enabled_flag shall be equal to 0. no_bdof_constraint_flag equal to 0 does not impose such a constraint.

no_dmvr_constraint_flag equal to 1 specifies that sps_dmvr_enabled_flag shall be equal to 0. no_dmvr_constraint_flag equal to 0 does not impose such a constraint.

no_cclm_constraint_flag equal to 1 specifies that sps_cclm_enabled_flag shall be equal to 0. no_cclm_constraint_flag equal to 0 does not impose such a constraint.

no_mts_constraint_flag equal to 1 specifies that sps_mts_enabled_flag shall be equal to 0. no_mts_constraint_flag equal to 0 does not impose such a constraint.

no_sbt_constraint_flag equal to 1 specifies that sps_sbt_enabled_flag shall be equal to 0. no_sbt_constraint_flag equal to 0 does not impose such a constraint.

no_lfnst_constraint_flag equal to 1 specifies that sps_lfnst_enabled_flag shall be equal to 0. no_lfnst_constraint_flag equal to 0 does not impose such a constraint.

no_affine_motion_constraint_flag equal to 1 specifies that sps_affine_enabled_flag shall be equal to 0. no_affine_motion_constraint_flag equal to 0 does not impose such a constraint.

no_mmvd_constraint_flag equal to 1 specifies that sps_mmvd_enabled_flag shall be equal to 0. no_mmvd_constraint_flag equal to 0 does not impose such a constraint.

no_smvd_constraint_flag equal to 1 specifies that sps_smvd_enabled_flag shall be equal to 0. no_smvd_constraint_flag equal to 0 does not impose such a constraint.

no_prof_constraint_flag equal to 1 specifies that sps_affine_prof_enabled_flag shall be equal to 0. no_prof_constraint_flag equal to 0 does not impose such a constraint.

no_bcw_constraint_flag equal to 1 specifies that sps_bcw_enabled_flag shall be equal to 0. no_bcw_constraint_flag equal to 0 does not impose such a constraint.

no_ibc_constraint_flag equal to 1 specifies that sps_ibc_enabled_flag shall be equal to 0. no_ibc_constraint_flag equal to 0 does not impose such a constraint.

no_ciip_constraint_flag equal to 1 specifies that sps_ciip_enabled_flag shall be equal to 0. no_cipp_constraint_flag equal to 0 does not impose such a constraint.

no_gpm_constraint_flag equal to 1 specifies that sps_gpm_enabled_flag shall be equal to 0. no_gpm_constraint_flag equal to 0 does not impose such a constraint.

no_ladf_constraint_flag equal to 1 specifies that sps_ladf_enabled_flag shall be equal to 0. no_ladf_constraint_flag equal to 0 does not impose such a constraint.

no_transform_skip_constraint_flag equal to 1 specifies that sps_transform_skip_enabled_flag shall be equal to 0. no_transform_skip_constraint_flag equal to 0 does not impose such a constraint.

no_bdpcm_constraint_flag equal to 1 specifies that sps_bdpcm_enabled_flag shall be equal to 0. no_bdpcm_constraint_flag equal to 0 does not impose such a constraint.

no_weighted_prediction_constraint_flag equal to 1 specifies that sps_weighted_pred_flag and sps_weighted_bipred_flag shall both be equal to 0. no_weighted_prediction_constraint_flag equal to 0 does not impose such a constraint.

no_palette_constraint_flag equal to 1 specifies that sps_palette_enabled_flag shall be equal to 0. no_palette_constraint_flag equal to 0 does not impose such a constraint.

no_act_constraint_flag equal to 1 specifies that sps_act_enabled_flag shall be equal to 0. no_act_constraint_flag equal to 0 does not impose such a constraint.

no_lmcs_constraint_flag equal to 1 specifies that sps_lmcs_enabled_flag shall be equal to 0. no_lmcs_constraint_flag equal to 0 does not impose such a constraint.

no_cu_qp_delta_constraint_flag equal to 1 specifies that pps_cu_qp_delta_enabled_flag shall be equal to 0. no_cu_qp_delta_constraint_flag equal to 0 does not impose such a constraint.

no_chroma_qp_offset_constraint_flag equal to 1 specifies that pps_cu_chroma_qp_offset_list_enabled_flag shall be equal to 0. no_chroma_qp_offset_constraint_flag equal to 0 does not impose such a constraint.

no_dep_quant_constraint_flag equal to 1 specifies that sps_dep_quant_enabled_flag shall be equal to 0. no_dep_quant_constraint_flag equal to 0 does not impose such a constraint.

no_sign_data_hiding_constraint_flag equal to 1 specifies that sps_sign_data_hiding_enabled_flag shall be equal to 0. no_sign_data_hiding_constraint_flag equal to 0 does not impose such a constraint.

no_mixed_nalu_types_in_pic_constraint_flag equal to 1 specifies that it is a requirement of bitstream conformance that pps_mixed_nalu_types_in_pic_flag shall be equal to 0. no_mixed_nalu_types_in_pic_constraint_flag equal to 0 does not impose such a constraint.

no_trail_constraint_flag equal to 1 specifies that there shall be no NAL unit with nuh_unit_type equal to TRAIL NUT present in OlsInScope. no_trail_constraint_flag equal to 0 does not impose such a constraint.

no_stsa_constraint_flag equal to 1 specifies that there shall be no NAL unit with nuh_unit_type equal to STSA_NUT present in OlsInScope. no_stsa_constraint_flag equal to 0 does not impose such a constraint.

no_rasl_constraint_flag equal to 1 specifies that there shall be no NAL unit with nuh_unit_type equal to RASL_NUT present in OlsInScope. no_rasl_constraint_flag equal to 0 does not impose such a constraint.

no_radl_constraint_flag equal to 1 specifies that there shall be no NAL unit with nuh_unit_type equal to RADL NUT present in OlsInScope. no_radl_constraint_flag equal to 0 does not impose such a constraint.

no_idr_constraint_flag equal to 1 specifies that there shall be no NAL unit with nuh_unit_type equal to IDR_W_RADL or IDR_N_LP present in OlsInScope. no_idr_constraint_flag equal to 0 does not impose such a constraint.

no_cra_constraint_flag equal to 1 specifies that there shall be no NAL unit with nuh_unit_type equal to CRA NUT present in OlsInScope. no_cra_constraint_flag equal to 0 does not impose such a constraint.

no_gdr_constraint_flag equal to 1 specifies that sps_gdr_enabled_flag shall be equal to 0. no_gdr_constraint_flag equal to 0 does not impose such a constraint.

no_aps_constraint_flag equal to 1 specifies that there shall be no NAL unit with nuh_unit_type equal to PREFIX_APS_NUT or SUFFIX_APS_NUT present in OlsInScope, and sps_lmcs_enabled_flag and sps_scaling_list_enabled_flag shall both be equal to 0. no_aps_constraint_flag equal to 0 does not impose such a constraint.

gci_alignment_zero_bits shall be equal to 0.

gci_num_reserved_bytes specifies the number of the reserved constraint bytes. The value of gci_num_reserved_bytes shall be 0. Other values of gci_num_reserved_bytes are reserved for future use by ITU-T|ISO/IEC and shall not be present in bitstreams conforming to this version of this Specification.

gci_reserved_byte[i] may have any value. Its presence and value do not affect decoder conformance to profiles specified in this version of this Specification. Decoders conforming to this version of this Specification shall ignore the values of all the gci_reserved_byte[i] syntax elements.

3.6. Conditional Signaling of GCI Fields

JVET-S0050 and JVET-S0127 both proposes to add a presence flag, in the PTL syntax structure, to specifies the presence of the GCI syntax structure in the in the PTL syntax structure, with the only difference being that the following is done in S0050 and not done in S0127: S0050 adds byte alignment in the PTL syntax structure immediately after the GCI syntax structure, when present, to make sure that general_level_idc starts at a byte-aligned position in the PTL syntax structure, and consequently removed the byte alignment inside the GCI syntax structure.

The JVET-S0050 syntax changes are as follows, wherein parts that have been added or modified are bolded, underlined and italicized, e.g., "using A *and B* ", and some of the deleted parts are italicized with strikethrough, e.g., "based on A and B".

```
profile_tier_level
( profileTierPresentFlag,
maxNumSubLayersMinus1 ) {                          Descriptor if( profileTierPresentFlag ) {
    general_profile_idc                            u(7)
    general_tier_flag                              u(1)
    gci_present_flag                               u(1)
    if( gci_present_flag )
      general_constraint_info( )
      while( !byte_aligned() )
        ptl_alignment_zero_bit                     f(1)
  }
  general_level_idc                                u(8)
  ...
```

```
general_constraint_info( ) {                       Descriptor
  ...
  while( !byte_aligned() )
    gci_alignment_zero_bit                         f(1)
  gci_num_reserved_bits //The 2 changes            u(811)
  of "byte" to "bit" are purely editorial
  for( i = 0; i < gci_num_
  reserved_bits; i++ )
    gci_reserved_bit[ i ]                          u(81)
}
```

The JVET-S0127 syntax changes are as follows:

```
profile_tier_level
( profileTierPresentFlag,
maxNumSubLayersMinus1 ) {                          Descriptor if( profileTierPresentFlag ) {
    general_profile_idc                            u(7)
    general_tier_flag                              u(1)
    general_constraint_info_present_flag           u(1)
    if( general_constraint_info_present_flag )
      general_constraint_info( )
  }
  general_level_idc                                u(8)
  ...
```

JVET-S0092 only changes the GCI syntax structure itself. It moves the GCI extension length indicator (gci_num_reserved_bytes) in the GCI syntax structure from last to first (gci_num_constraint_bytes) to enable skip signaling of the GCI fields. The value of gci_num_reserved_bytes shall be equal to either 0 or 9.

The S0092 syntax changes are as follows:

```
general_constraint_info( ) {                       Descriptor
  gci_num_constraint_bytes                         u(8)
  gci_num_constraint_byte: constraint_bytes > 8 )
  gci_num_constraint_bytes
  general_non_packed_constraint_flag               u(1)
  general_frame_only_constraint_flag               u(1)
  ... /* 61 more syntax elements */
  no_aps_constraint_flag                           u(1)
  while( !byte_aligned( ) )
    gci_alignment_zero_bit                         f(1)
  }
  gci_num_reserved_bytes                           u(8)
  for( i = 0; i < gci_num_
  reservedconstraintbytes - 9; i++ )
    gci_reserved_byte[ i ]                         u(8)
}
```

Here are some comparisons regarding the different approaches:

1) Regarding JVET-S0050 and JVET-S0127, the difference is on whether to make sure that general_level_idc is at a byte-aligned position in the PTL syntax structure (including when the GCI presence flag is equal to 0). The DCI, VPS, and SPS syntax have all been designed to make sure the each PTL syntax structure, when present, is at a byte-aligned position in the DCI/VPS/SPS. I hope we don't have to argue a lot to conclude that we should keep general_level_idc at a byte-aligned position in the PTL syntax structure. If that can be achieved, then JVET-S0050 and JVET-S0127 are the same.

2) The difference between having a GCI presence flag in the PTL syntax structure (as in JVET-S0050 and JVET-S0127) and manipulating the syntax within the GCI syntax structure as follows. They both specify that, between general_tier_flag and general_level_idc, there is some GCI information in the PTL syntax structure. The GCI presence flag approach uses a flag to specify the presence of the GCI fields, while the JVET-S0092 approach uses an 8-bit size indicator to achieve that purpose. Counting the number of bits, the JVET-S0050 approach uses 1 bit for the flag plus 0 to 7 byte alignment bits, while the JVET-S0092 approach uses 8 bits for the size indicator plus 0 to 7 byte alignment bits. So essentially the difference is just 7 bits.

3) There is one semantics error in JVET-S0092: if the value of gci_num_reserved_bytes shall be equal to either 0 or 9, then there can never be a gci_reserved_byte[i] in the GCI syntax structure. Of course, that can be easily resolved by saying something like the value of gci_num_reserved_bytes shall be either equal to 0 or equal to or greater than 9.

4. Technical Problems Solved by Technical Solutions Disclosed Herein

The existing designs for signaling of the CGI fields need to spend more bits than needed.

5. Embodiments of the Disclosure

To solve the above problems and some other problems not mentioned, methods as summarized below are disclosed. The items should be considered as examples to explain the general concepts and should not be interpreted in a narrow way. Furthermore, these items can be applied individually or combined in any manner.
1) To solve the first problem, regarding conditional signaling of the GCI fields in a PTL syntax structure, one or more of the following approaches are disclosed, e.g., as in the 1st embodiment:
   a. Instead of being immediately after general_tier_flag, move the general_constraint_info( ) syntax structure and/or other GCI related syntax elements (e.g., presence of GCI flags) after the indication of level information.
      i. In one example, move the general_constraint_info( ) syntax structure in the profile_tier_level( ) syntax structure to be immediately after the general_sub_profile_idc[i] syntax element.
   b. Add a new syntax element (e.g., a 1-bit flag, named gci_present_flag) in the profile_tier_level( ) syntax structure, to condition the presence of the general_constraint_info( ) syntax structure.
      i. When gci_present_flag equal to 1 for a profile_tier_level( ) syntax structure with profileTierPresentFlag equal to 1, the general_constraint_info( ) syntax structure is present in the profile_tier_level( ) syntax structure. When gci_present_flag equal to 0 for a profile_tier_level( ) syntax structure (regardless of whether the profileTierPresentFlag equal to 1), the general_constraint_info( ) syntax structure is not present in the profile_tier_level( ) syntax structure.
      ii. The semantics of is changed such that the semantics of the GCI fields only apply when they are present (i.e., when gci_present_flag is equal to 1). In other words, when gci_present_flag is equal to 0, no general constraints apply in addition to other specified constraints, such as those specified as part of the profile definition.
      iii. Alternatively, furthermore, the new syntax element may be conditionally signalled, e.g., according to the value of profileTierPresentFlag.
   c. Remove the byte alignment syntax (i.e., the gci_alignment_zero_bit field and its syntax condition) from the general_constraint_info( ) syntax structure.
   d. Instead of signaling the total number of reserved constraint bytes and the reserved constraint bytes, the number of reserved constraint bits and/or the value of each reserved constraint bit may be signalled.
      i. In one example, change the GCI syntax element gci_num_reserved_bytes to gci_num_reserved_bits.
      ii. Alternatively, furthermore, the changed GCI syntax element may be coded with u(11) instead of u(8),
      iii. Alternatively, furthermore, change the GCI syntax element gci_reserved_byte[i] to gci_reserved_bit[i], coded with u(1) instead of u(8).
2) To solve the first problem, regarding conditional signaling of the GCI fields in a PTL syntax structure, one or more of the following approaches are disclosed, e.g., as in the 2nd embodiment:
   a. Instead of being immediately after general_tier_flag, move the general_constraint_info( ) syntax structure and/or other GCI related syntax elements (e.g., presence of GCI flags) after the indication of level information.
      i. In one example, move the general_constraint_info( ) syntax structure in the profile_tier_level( ) syntax structure to be immediately after the general_sub_profile_idc[i] syntax element (instead of being immediately after general_tier_flag).
   b. Add a new syntax element (e.g., a 1-bit flag, named gci_present_flag), in the profile_tier_level( ) syntax structure, to condition the presence of the general_constraint_info( ) syntax structure.
      i. When gci_present_flag equal to 1 for a profile_tier_level( ) syntax structure with profileTierPresentFlag equal to 1, the general_constraint_info( ) syntax structure is present in the profile_tier_level( ) syntax structure. When gci_present_flag equal to 0 for a profile_tier_level( ) syntax structure (regardless of whether the profileTierPresentFlag equal to 1), the general_constraint_info( ) syntax structure is not present in the profile_tier_level( ) syntax structure.
      ii. The semantics of is changed such that the semantics of the GCI fields only apply when they are present (i.e., when gci_present_flag is equal to 1). In other words, when gci_present_flag is equal to 0, no general constraints apply in addition to other specified constraints, such as those specified as part of the profile definition.
      iii. Alternatively, furthermore, the new syntax element may be conditionally signalled, e.g., according to the value of profileTierPresentFlag.
3) To solve the first problem, regarding conditional signaling of the GCI fields in a PTL syntax structure, one or more of the following approaches are disclosed, e.g., as in the 1st embodiment:
   a. Instead of being immediately after general_tier_flag, move the general_constraint_info( ) syntax structure and/or other GCI related syntax elements (e.g., presence of GCI flags) right before the byte alignment checking conditions in the PTL syntax structure (e.g., right before the while(!byte aligned( )) loop).
      i. In one example, move the general_constraint_info( ) syntax structure in the profile_tier_level( ) syntax structure to be immediately after the ptl_sublayer_level_present_flag[i] syntax element (instead of being immediately after general_tier_flag).
   b. Add a new syntax element (e.g., a 1-bit flag, named gci_present_flag), in the profile_tier_level( ) syntax structure, to condition the presence of the general_constraint_info( ) syntax structure.
      i. When gci_present_flag equal to 1 for a profile_tier_level( ) syntax structure with profileTierPresentFlag equal to 1, the general_constraint_info( ) syntax structure is present in the profile_tier_level( ) syntax structure. When gci_present_flag equal to 0 for a profile_tier_level( ) syntax structure (regardless of whether the profileTierPresentFlag equal to 1), the general_constraint_info( ) syntax structure is not present in the profile_tier_level( ) syntax structure.
      ii. The semantics of is changed such that the semantics of the GCI fields only apply when they are present (i.e., when gci_present_flag is equal to 1). In other words, when gci_present_flag is equal to 0, no general constraints apply in addition to other specified constraints, such as those specified as part of the profile definition.
      iii. Alternatively, furthermore, the new syntax element may be conditionally signalled, e.g., according to the value of profileTierPresentFlag.
   c. Remove the byte alignment syntax (i.e., the gci_alignment_zero_bit field and its syntax condition) from the general_constraint_info( ) syntax structure.
   d. Instead of signaling the total number of reserved constraint bytes and the reserved constraint bytes, the number of reserved constraint bits and/or the value of each reserved constraint bit may be signalled.
  i. In one example, change the GCI syntax elements gci_num_reserved_bytes to gci_num_reserved_bits
  ii. Alternatively, furthermore, the changed GCI syntax element may be coded with u(11) instead of u(8).
  iii. Alternatively, furthermore, change the GCI syntax element gci_reserved_byte[i] to gci_reserved_bit[i], coded with u(1) instead of u(8).
4) To solve the first problem, regarding conditional signaling of the GCI fields in a PTL syntax structure, one or more of the following approaches are disclosed, e.g., as in the 2nd embodiment:
  a. Instead of being immediately after general_tier_flag, move the general_constraint_info( ) syntax structure and/or other GCI related syntax elements (e.g., presence of GCI flags) right before the byte alignment checking conditions in the PTL syntax structure (e.g., right before the while(!byte aligned( )) loop).
    i. In one example, move the general_constraint_info( ) syntax structure in the profile_tier_level( ) syntax structure to be immediately after the ptl_sublayer_level_present_flag[i] syntax element.
  b. Add a new syntax element (e.g., a 1-bit flag, named gci_present_flag), in the profile_tier_level( ) syntax structure, to condition the presence of the general_constraint_info( ) syntax structure.
    i. When gci_present_flag equal to 1 for a profile_tier_level( ) syntax structure with profileTierPresentFlag equal to 1, the general_constraint_info( ) syntax structure is present in the profile_tier_level( ) syntax structure. When gci_present_flag equal to 0 for a profile_tier_level( ) syntax structure (regardless of whether the profileTierPresentFlag equal to 1), the general_constraint_info( ) syntax structure is not present in the profile_tier_level( ) syntax structure.
    ii. The semantics of is changed such that the semantics of the GCI fields only apply when they are present (i.e., when gci_present_flag is equal to 1). In other words, when gci_present_flag is equal to 0, no general constraints apply in addition to other specified constraints, such as those specified as part of the profile definition.
    iii. Alternatively, furthermore, the new syntax element may be conditionally signalled, e.g., according to the value of profileTierPresentFlag.
5) To solve the first problem, regarding conditional signaling of the GCI fields in a PTL syntax structure, one or more of the following approaches are disclosed, e.g., as in the 5th embodiment:
  a. Instead of being before the general_level_idc, move the general_constraint_info( ) syntax structure and/or other GCI related syntax elements (e.g., presence of GCI flags) after the general_level_idc.
    i. Move the general_constraint_info( ) syntax structure in the profile_tier_level( ) syntax structure to be immediately after the general_level_idc syntax element.
  b. Move the byte alignment syntax (i.e., the gci_alignment_zero_bit field and its syntax condition) to the end of the general_constraint_info( ) syntax structure, i.e., after the GCI reserved fields instead of before the GCI reserved fields.
  c. Instead of signaling the total number of reserved constraint bytes and the reserved constraint bytes, the number of reserved constraint bits and/or value of each reserved constraint bit may be signalled.
    i. In one example, change the GCI syntax elements gci_num_reserved_bytes to gci_num_reserved_bits
    ii. Alternatively, furthermore, the changed GCI syntax element may be coded with u(11) instead of u(8), \
    iii. Alternatively, furthermore, change the GCI syntax element gci_reserved_byte[i] to gci_reserved_bit[i], coded with u(1) instead of u(8).
  d. Add a new syntax element (e.g., a 1-bit flag, named gci_present_flag), at the beginning of the general_constraint_info( ) syntax structure.
    i. When gci_present_flag equal to 0, all fields in the general_constraint_info( ) syntax structure, except the byte alignment fields, are skipped. The semantics of all these skipped fields are changed such that the semantics only apply when they are present (i.e., when gci_present_flag is equal to 1). In other words, when gci_present_flag is equal to 0, no general constraints apply in addition to other specified constraints, such as those specified as part of the profile definition.
6) To solve the first problem, regarding conditional signaling of the GCI fields in a PTL syntax structure, one or more of the following approaches are disclosed, e.g., as in the 6th embodiment:
  a. Instead of being before the general_level_idc, move the general_constraint_info( ) syntax structure and/or other GCI related syntax elements (e.g., presence of GCI flags) after the general_level_idc.
    i. In one example, move the general_constraint_info( ) syntax structure in the profile_tier_level( ) syntax structure to be immediately after the general_level_idc syntax element.
  b. Add a new syntax element (e.g., a 1-bit flag, named gci_present_flag), in the profile_tier_level( ) syntax structure to condition the presence of general_constraint_info( ) syntax structure.
    i. When gci_present_flag equal to 1 for a profile_tier_level( ) syntax structure with profileTierPresentFlag equal to 1, the general_constraint_info( ) syntax structure is present in the profile_tier_level( ) syntax structure. When gci_present_flag equal to 0 for a profile_tier_level( ) syntax structure (regardless of whether the profileTierPresentFlag equal to 1), the general_constraint_info( ) syntax structure is not present in the profile_tier_level( ) syntax structure.
    ii. The semantics of all the GCI syntax structure is changed such that the semantics of the GCI fields only apply when they are present (i.e., when gci_present_flag is equal to 1). In other words, when gci_present_flag is equal to 0, no general constraints apply in addition to other specified constraints, such as those specified as part of the profile definition.
    iii. To keep the starting position of ptl_num_sub_profiles, when present, to be a byte-aligned position, immediately after the general_constraint_info( ) syntax structure, add byte alignment check and, if not byte aligned, add ptl_alignment_zero_bit until it is byte aligned.
  c. Remove the byte alignment syntax (i.e., the gci_alignment_zero_bit field and its syntax condition) from the general_constraint_info( ) syntax structure.
  d. Instead of signaling the total number of reserved constraint bytes and the reserved constraint bytes, the number of reserved constraint bits and/or the value of each reserved constraint bit may be signalled.
    i. In one example, change the GCI syntax element gci_num_reserved_bytes to gci_num_reserved_bits.

ii. Alternatively, furthermore, the changed syntax element may be coded with u(11) instead of u(8),
iii. alternatively, furthermore, change the GCI syntax element gci_reserved_byte[i] to gci_reserved_bit[i], coded with u(1) instead of u(8).
7) To solve the first problem, regarding conditional signaling of the GCI fields in a PTL syntax structure, one or more of the following approaches are disclosed, e.g., as in the 5th embodiment:
   a. Instead of being before the general_level_idc, move the general_constraint_info( ) syntax structure and/or other GCI related syntax elements (e.g., presence of GCI flags) after the general_level_idc.
      i. In one example, move the general_constraint_info( ) syntax structure in the profile_tier_level( ) syntax structure to be immediately after the general_level_idc syntax element.
   b. Add a new syntax element (e.g., a 1-bit flag, named gci_present_flag), in the profile_tier_level( ) syntax structure to condition the presence of general_constraint_info( ) syntax structure.
      i. When gci_present_flag equal to 1 for a profile_tier_level( ) syntax structure with profileTierPresentFlag equal to 1, the general_constraint_info( ) syntax structure is present in the profile_tier_level( ) syntax structure. When gci_present_flag equal to 0 for a profile_tier_level( ) syntax structure (regardless of whether the profileTierPresentFlag equal to 1), the general_constraint_info( ) syntax structure is not present in the profile_tier_level( ) syntax structure.
      ii. The semantics of all the GCI syntax structure is changed such that the semantics of the GCI fields only apply when they are present (i.e., when gci_present_flag is equal to 1). In other words, when gci_present_flag is equal to 0, no general constraints apply in addition to other specified constraints, such as those specified as part of the profile definition.
      iii. To keep the starting position of ptl_num_sub_profiles, when present, to be a byte-aligned position, immediately after the general_constraint_info( ) syntax structure, add byte alignment check and, if not byte aligned, add ptl_alignment_zero_bit until it is byte aligned.
8) Change the semantics of max_bitdepth_minus8_constraint_idc to be as follows: max_bitdepth_minus8_constraint_idc less than 8 specifies that sps_bitdepth_minus8 shall be in the range of 0 to max_bitdepth_minus8_constraint_idc, inclusive. max_bitdepth_minus8_constraint_idc equal to or greater than 8 does not impose a constraint.
   a. Alternatively, "does not impose a constraint" above is changed to be "does not impose such a constraint".
9) Change the semantics of max_chroma_format_constraint_idc to be as follows: max_chroma_format_constraint_idc less than 2 specifies that sps_chroma_format_idc shall be in the range of 0 to max_chroma_format_constraint_idc, inclusive. max_chroma_format_constraint_idc equal to 2 does not impose a constraint.
   a. Alternatively, "does not impose a constraint" above is changed to be "does not impose such a constraint".

6. Embodiments

Below are some example embodiments for some of the aspects summarized above in this Section, which can be applied to the VVC specification. The changed texts are based on the latest VVC text in JVET-S0152-v3. Most relevant parts that have been added or modified are bolded, underlined and italicized, e.g., "using A *and B* ", and some of the deleted parts are italicized with strikethrough, e.g., "based on A and B".

6.1. Embodiment 1

This embodiment is for item 1 and its sub-items.
The syntax structure profile_tier_level ( ) is changed as follows:

| profile_tier_level<br>( profileTierPresentFlag,<br>maxNumSubLayersMinus1 ) { | Descriptor |
|---|---|
| if( profileTierPresentFlag ) { | |
|   general_profile_idc | u(7) |
|   general_tier_flag | u(1) |
|   ~~general_constraint_info()~~ | |
| } | |
| general_level_idc | u(8) |
| if( profileTierPresentFlag ) { | |
|   ptl_num_sub_profiles | u(8) |
|   for( i = 0; i < ptl_num_sub_profiles; i++ ) | |
|     general_sub_profile_idc[ i ] | u(32) |
|   *gci_present_flag* | *u(1)* |
|   *if( gci_present_flag )* | |
|     *general_constraint_info()* | |
| } | |
| for( i = 0; i < maxNumSubLayersMinus1; i++ ) | |
|   ptl_sublayer_level_present_flag[ i ] | u(1) |
| while( !byte_aligned( ) ) | |
|   ptl_alignment_zero_bit | f(1) |
| for( i = 0; i < maxNumSubLayersMinus1; i++ ) | |
|   if( ptl_sublayer_level_present_flag[ i ] ) | |
|     sublayer_level_idc[ i ] | u(8) |
| } | |

And the semantics are changed as follows:
*gci_present_flag equal to 1 specifies that the general constraint_info() syntax structure is present in the profile_tier_ level() syntax structure when profileTierPresent Flag is equal to 1. gci_present_flag equal to 0 specifies that the general constraint_info() syntax structure is not present in the profile_tier_level() syntax structure. The sematnics of the GCI fields in general_ constraint_ info() syntax structure apply when gci_present_ flag is equal to 1. When gci_ present_flag is equal to 0, the general_ constraint_info() syntax structure does not impose any constraint.*

The syntax structure general_constraint_info ( ) is changed as follows:

| general_constraint_info( ) { | Descriptor |
|---|---|
| ... | |
| ~~while( !byte_aligned() )~~ | |
|   ~~gci_alignment_zero_bit~~ | ~~f(1)~~ |
| gci_num_reserved_b*its*~~ytes~~ | u(~~8~~*11*) |
| for( i = 0; i < gci_num_reserved_b*its*~~ytes~~; i++ ) | |
|   gci_reserved_b*it*~~yte~~[ i ] | u(~~8~~*1*) |
| } | |

And the semantics are changed as follows:
~~gci_alignment_zero_bits shall be equal to 0.~~
gci_num_reserved_b*its*~~ytes~~ specifies the number of the reserved constraint b*its*~~ytes~~. The value of gci_num_reserved_b*itsytes* shall be 0. Other values of gci_num_reserved_b*itsytes* are reserved for future use by ITU-T|ISO/IEC and shall not be present in bitstreams conforming to this version of this Specification.

gci_reserved_b*ityte* [i] may have any value. Its presence and value do not affect decoder conformance to profiles specified in this version of this Specification. Decoders conforming to this version of this Specification shall ignore the values of all the gci_reserved_b*itsytes* [i] syntax elements.

6.2. Embodiment 2

This embodiment is for item 2 and its sub-items.

The syntax structure profile_tier_level ( ) is changed as follows:

```
profile_tier_level
( profileTierPresentFlag,
maxNumSubLayersMinus1 ) {                               Descriptor if( profileTierPresentFlag ) {
    general_profile_idc                                    u(7)
    general_tier_flag                                      u(1)
                general_constraint_info()
  }
  general_level_idc                                        u(8)
  if( profileTierPresentFlag ) {
    ptl_num_sub_profiles                                   u(8)
    for( i = 0; i < ptl_num_
    sub_profiles; i++ )
      general_sub_profile_idc[ i ]                         u(32)
              gci_present_flag                              u(1)
              if( gci_present_flag )
                    general_constraint_info()
  }
  for( i = 0; i < maxNumSub-
  LayersMinus1; i++ )
    ptl_sublayer_level_present_flag[ i ]                   u(1)
  while( !byte_aligned( ) )
    ptl_alignment_zero_bit                                 f(1)
  for( i = 0; i < maxNumSub-
  LayersMinus1; i++ )
    if( ptl_sublayer_level_
    present_flag[ i ] )
      sublayer_level_idc[ i ]                              u(8)
}
```

And the semantics are changed as follows:

*gci_present_ flag equal to 1 specifies that the general_ constraint_info( )syntax structure is present in the profile_tier _level( ) syntax structure when profileTier PresentFlag isequal to 1. gci _present_flag equal to 0 specifies that the general_ constraint_info( ) syntax structureis not present in the profile_tier_ level( ) syntax structure.*

*The sematnics of the GCI fields in general_ constraint_info( ) syntaxstructure apply when gci_present_ flag is equal to 1. When gci_ present_flag is equal to 0, thegeneral_ constraint_info( ) syntaxstructure does not impose any constraint.*

6.3. Embodiment 3

This embodiment is for item 3 and its sub-items.

The syntax structure profile_tier_level ( ) is changed as follows:

```
profile_tier_level
( profileTierPresentFlag,
maxNumSubLayersMinus1 ) {                               Descriptor if( profileTierPresentFlag ) {
    general_profile_idc                                    u(7)
    general_tier_flag                                      u(1)
                general_constraint_info()
  }
  general_level_idc                                        u(8)
  if( profileTierPresentFlag ) {
    ptl_num_sub_profiles                                   u(8)
    for( i = 0; i < ptl_num_
    sub_profiles; i++ )
      general_sub_profile_idc[ i ]                         u(32)
  }
  for( i = 0; i < maxNumSub-
  LayersMinus1; i++ )
    ptl_sublayer_level_present_flag[ i ]                   u(1)
        if( profileTierPresentFlag ) {
              gci_present_flag                              u(1)
              if( gci_present_flag )
                    general_constraint_info()
        }
  while( !byte_aligned( ) )
    ptl_alignment_zero_bit                                 f(1)
  for( i = 0; i < maxNumSub-
  LayersMinus1; i++ )
    if( ptl_sublayer_level_
    present_flag[ i ] )
      sublayer_level_idc[ i ]                              u(8)
}
```

And the semantics are changed as follows:

*gci_present_ flag equal to 1 specifies that the general_ constraint_info( ) syntax structure is present in the profile_ tier_level( ) syntax structure when profile TierPresentFlag is equal to 1. gci_present_flag equal to 0 specifies that the general_ constraint_info( ) syntax structure is not present in the profile_tier_ level( ) syntax structure.*

*The sematnics of the GCI fields in general_ constraint_info( ) syntax structureapply when gci_present_ flag is equal to 1. When gci_ present_flag is equal to 0, the general_constraint_info( ) syntax structure does not imposeany constraint.*

In one example, alternatively, furthermore, the syntax structure general_constraint_info ( ) is changed as follows:

```
general_constraint_info( ) {                            Descriptor
  ...
        while( !byte_aligned() )
              gci_alignment_zero_bit                        f(1)
  gci_num_reserved_bitsytes                              u(811)
  for( i = 0; i < gci_num_
  reserved_bitsytes; i++ )
    gci_reserved_bityte[ i ]                              u(81)
}
```

And the semantics are changed as follows:

*gci_alignment_ zero_bits shall be equal to 0.* gci_num_reserved_b*itsytes* specifies the number of the reserved constraint b*itsytes* . The value of gci_num_reserved_b*itsytes* shall be 0. Other values of gci_num_reserved_b*itsytes* are reserved for future use by ITU-T|ISO/IEC and shall not be present in bitstreams conforming to this version of this Specification.

gci_reserved_b*itsyte* [i] may have any value. Its presence and value do not affect decoder conformance to profiles specified in this version of this Specification. Decoders conforming to this version of this Specification shall ignore the values of all the gci_reserved_~~bits~~*bytes* [i] syntax elements.

6.4. Embodiment 4

This embodiment is for item 4 and its sub-items.
The syntax structure profile_tier_level ( ) is changed as follows:

| profile_tier_level<br>( profileTierPresentFlag,<br>maxNumSubLayersMinus1 ) { | Descriptor |
|---|---|
|   if( profileTierPresentFlag ) { | |
|     general_profile_idc | u(7) |
|     general_tier_flag | u(1) |
|     ~~general_constraint_info()~~ | |
|   } | |
|   general_level_idc | u(8) |
|   if( profileTierPresentFlag ) { | |
|     ptl_num_sub_profiles | u(8) |
|     for( i = 0; i < ptl_num_<br>    sub_profiles; i++ ) | |
|       general_sub_profile_idc[ i ] | u(32) |
|   } | |
|   for( i = 0; i < maxNumSub-<br>  LayersMinus1; i++ ) | |
|     ptl_sublayer_level_<br>    present_flag[ i ] | u(1) |
|     *if( profileTierPresentFlag ) {* | |
|       *gci_present_flag* | *u(1)* |
|       *if( gci_present_flag )* | |
|         *general_constraint_info()* | |
|     *}* | |
|   while( !byte_aligned( ) ) | |
|     ptl_alignment_zero_bit | f(1) |
|   for( i = 0; i < maxNumSub-<br>  LayersMinus1; i++ ) | |
|     if( ptl_sublayer_level_<br>    present_flag[ i ] ) | |
|       sublayer_level_idc[ i ] | u(8) |
| } | |

And the semantics are changed as follows:
*gci_present_flag equal to 1 specifies that the general_constraint_info() syntax structure is present in the profile_tier_level () syntax structure when profileTierPresentFlag is equal to 1. gci_present_flag equal to 0 specifies that the general_constraint_info() syntax structure is not present in the profile_tier_level() syntax structure. The sematnics of the GCI fields in general_constraint_info() syntax structure apply when gci_present_flag is equal to 1. When gci_present_flag is equal to 0, the general_constraint_info() syntax structure does not impose any constraint.*

6.5. Embodiment 5

This embodiment is for item 5 and its sub-items.
The syntax structure profile_tier_level ( ) is changed as follows:

| profile_tier_level<br>( profileTierPresentFlag,<br>maxNumSubLayersMinus1 ) { | Descriptor |
|---|---|
|   if( profileTierPresentFlag ) { | |
|     general_profile_idc | u(7) |
|     general_tier_flag | u(1) |
|     ~~general_constraint_info()~~ | |
|   } | |

| profile_tier_level<br>( profileTierPresentFlag,<br>maxNumSubLayersMinus1 ) { | Descriptor |
|---|---|
|   general_level_idc | u(8) |
|     *if( profileTierPresentFlag )* | |
|       *general_constraint_info()* | |
|   if( profileTierPresentFlag ) { | |
|     ptl_num_sub_profiles | u(8) |
|     for( i = 0; i < ptl_num_<br>    sub_profiles; i++ ) | |
|       general_sub_profile_idc[ i ] | u(32) |
|   } | |
|   for( i = 0; i < maxNumSub-<br>  LayersMinus1; i++ ) | |
|     ptl_sublayer_level_<br>    present_flag[ i ] | u(1) |
|   while( !byte_aligned( ) ) | |
|     ptl_alignment_zero_bit | f(1) |
|   for( i = 0; i < maxNumSub-<br>  LayersMinus1; i++ ) | |
|     if( ptl_sublayer_level_<br>    present_flag[ i ] ) | |
|       sublayer_level_idc[ i ] | u(8) |
| } | |

The syntax structure general_constraint_info ( ) is changed as follows:

| general_constraint_info( ) { | Descriptor |
|---|---|
|   *gci_present_flag* | *u(1)* |
|   *if( gci_present_flag ) {* | |
|   general_non_packed_constraint_flag | u(1) |
|   general_frame_only_constraint_flag | u(1) |
|   general_non_projected_constraint_flag | u(1) |
|   general_one_picture_only_<br>  constraint_flag | u(1) |
|   intra_only_constraint_flag | u(1) |
|   max_bitdepth_minus8_constraint_idc | u(4) |
|   max_chroma_format_constraint_idc | u(2) |
|   single_layer_constraint_flag | u(1) |
|   all_layers_independent_constraint_flag | u(1) |
|   no_ref_pic_resampling_constraint_flag | u(1) |
|   no_res_change_in_clvs_constraint_flag | u(1) |
|   one_tile_per_pic_constraint_flag | u(1) |
|   pic_header_in_slice_header_<br>  constraint_flag | u(1) |
|   one_slice_per_pic_constraint_flag | u(1) |
|   one_subpic_per_pic_constraint_flag | u(1) |
|   no_qtbtt_dual_tree_intra_<br>  constraint_flag | u(1) |
|   no_partition_constraints_<br>  override_constraint_flag | u(1) |
|   no_sao_constraint_flag | u(1) |
|   no_alf_constraint_flag | u(1) |
|   no_ccalf_constraint_flag | u(1) |
|   no_joint_cbcr_constraint_flag | u(1) |
|   no_mrl_constraint_flag | u(1) |
|   no_isp_constraint_flag | u(1) |
|   no_mip_constraint_flag | u(1) |
|   no_ref_wraparound_constraint_flag | u(1) |
|   no_temporal_mvp_constraint_flag | u(1) |
|   no_sbtmvp_constraint_flag | u(1) |
|   no_amvr_constraint_flag | u(1) |
|   no_bdof_constraint_flag | u(1) |
|   no_dmvr_constraint_flag | u(1) |
|   no_cclm_constraint_flag | u(1) |
|   no_mts_constraint_flag | u(1) |
|   no_sbt_constraint_flag | u(1) |
|   no_lfnst_constraint_flag | u(1) |
|   no_affine_motion_constraint_flag | u(1) |
|   no_mmvd_constraint_flag | u(1) |
|   no_smvd_constraint_flag | u(1) |
|   no_prof_constraint_flag | u(1) |
|   no_bcw_constraint_flag | u(1) |

```
general_constraint_info( ) {                              Descriptor
    no_ibc_constraint_flag                                u(1)
    no_ciip_constraint_flag                               u(1)
    no_gpm_constraint_flag                                u(1)
    no_ladf_constraint_flag                               u(1)
    no_transform_skip_constraint_flag                     u(1)
    no_bdpcm_constraint_flag                              u(1)
    no_weighted_pred_constraint_flag                      u(1)
    no_palette_constraint_flag                            u(1)
    no_act_constraint_flag                                u(1)
    no_lmcs_constraint_flag                               u(1)
    no_cu_qp_delta_constraint_flag                        u(1)
    no_chroma_qp_offset_constraint_flag                   u(1)
    no_dep_quant_constraint_flag                          u(1)
    no_sign_data_hiding_constraint_flag                   u(1)
    no_mixed_nalu_types_
        in_pic_constraint_flag                            u(1)
    no_trail_constraint_flag                              u(1)
    no_stsa_constraint_flag                               u(1)
    no_rasl_constraint_flag                               u(1)
    no_radl_constraint_flag                               u(1)
    no_idr_constraint_flag                                u(1)
    no_cra_constraint_flag                                u(1)
    no_gdr_constraint_flag                                u(1)
    no_aps_constraint_flag                                u(1)
        while( !byte_aligned() )
            gci_alignment_zero_bit                        f(1)
    gci_num_reserved_bits*bytes*                          u(*8*11)
    for( i = 0; i < gci_num_
        reserved_bits*bytes*; i++ )
        gci_reserved_bit*byte*[ i ]
}
        *while( !byte_aligned() )
            gci_alignment_zero_bit                        f(1)
}
```

And the semantics are changed as follows:

gci_present_ flag equal to 1 specifies that GCI fields are present in the general constraint_info( ) syntax structure. gci_present_ flag equal to 0 specifies that GCI fields are not present in the general_ constraint_info( ) syntax structure.

The sematnics of the GCI fields specpified below apply when gci present_flag is equal to 1. When gci_present_ flag is equal to 0, the general_ constraint_info( ) syntax structure does not impose any constraint.

~~gci_alignment zero_bits shall be equal to 0.~~ gci_num_reserved_ bits*bytes* specifies the number of the reserved constraint bits*bytes* . The value of gci_num_reserved_bits*bytes* shall be 0. Other values of gci_num_reserved_bits*bytes* are reserved for future use by ITU-T|ISO/IEC and shall not be present in bitstreams conforming to this version of this Specification.

gci_reserved_ bit*byte* [i] may have any value. Its presence and value do not affect decoder conformance to profiles specified in this version of this Specification. Decoders conforming to this version of this Specification shall ignore the values of all the gci_reserved_ bits*bytes* [i] syntax elements.

gci_alignment_ zero_bits shall be equal to 0.

6.6. Embodiment 6

This embodiment is for item 6 and its sub-items.

The syntax structure profile_tier_level ( ) is changed as follows:

```
profile_tier_level
( profileTierPresentFlag,
  maxNumSubLayersMinus1 ) {                               Descriptor
    if( profileTierPresentFlag ) {
        general_profile_idc                               u(7)
        general_tier_flag                                 u(1)
            general_constraint_info()
    }
    general_level_idc                                     u(8)
        if( profileTierPresentFlag ) {
            gci_present_flag                              u(1)
                if( gci_present_flag )
                    general_constraint_info()
                while( !byte_aligned() )
                    ptl_alignment_zero_bit                f(1)
        }
    if( profileTierPresentFlag ) {
        ptl_num_sub_profiles                              u(8)
        for( i = 0; i < ptl_num_
            sub_profiles; i++ )
            general_sub_profile_idc[ i ]                  u(32)
    }
    for( i = 0; i < maxNumSub-
        LayersMinus1; i++ )
        ptl_sublayer_level_present_flag[ i ]              u(1)
    while( !byte_aligned( ) )
        ptl_alignment_zero_bit                            f(1)
    for( i = 0; i < maxNumSub-
        LayersMinus1; i++ )
        if( ptl_sublayer_level_
            present_flag[ i ] )
            sublayer_level_idc[ i ]                       u(8)
}
```

And the semantics are changed as follows:

gci_present_ flag equal to 1 specifies that the general_ constraint_info( ) syntax structure is present in the profile_tier _level( ) syntax structure when profileTierPresent Flag is equal to 1. gci_present_flag equal to 0 specifies that the general_ constraint_info( ) syntax structure is not present in the profile_tier_level( ) syntax structure.

The sematnics of the GCI fields in general_constraint_ info( ) syntax structure apply when gci_present_ flag is equal to 1. When gci_ present_flag is equal to 0, the general_ constraint_info( ) syntax structure does not impose any constraint.

ptl_alignment_ zero_bit shall be equal to 0.

The syntax structure general_constraint_info ( ) is changed as follows:

```
general_constraint_info( ) {                              Descriptor
    ...
        while( !byte_aligned() )
            gci_alignment_zero_bit                        f(1)
    gci_num_reserved_bitsyte                              u(*8*11)
    for( i = 0; i < gci_num_
        reserved_bits*bytes*; i++ )
        gci_reserved_bit*byte*[ i ]                       u(*8*1)
}
```

And the semantics are changed as follows:

~~gci_alignment_ zero_bits shall be equal to 0.~~ gci_num_reserved_ bits*bytes* specifies the number of the reserved constraint bits*bytes* . The value of gci_num_reserved_bits*bytes* shall be 0. Other values of gci_num_reserved_bits*bytes* are reserved for future use by ITU-T|ISO/IEC and shall not be present in bitstreams conforming to this version of this Specification.

gci_reserved_ bit*byte* [i] may have any value. Its presence and value do not affect decoder conformance to profiles specified in this version of this Specification. Decoders conforming to this version of this Specification shall ignore the values of all the gci_reserved_b~~its~~*ytes* [i] syntax elements.

6.7. Embodiment 7

This embodiment is for item 7 and its sub-items.
The syntax structure profile_tier_level ( ) is changed as follows:

```
profile_tier_level
( profileTierPresentFlag,
maxNumSubLayersMinus1 ) {                      Descriptor if( profileTierPresentFlag ) {
    general_profile_idc                         u(7)
    general_tier_flag
             general_constraint_info()
  }
  general_level_idc                             u(8)
         if( profileTierPresentFlag ) {
                 gci_present_flag               u(1)
                 if( gci_present_flag )
                         general_constraint_info()
                 while( !byte_aligned( ) )
                         ptl_alignment_zero_bit f(1)
         }
  if( profileTierPresentFlag ) {
    ptl_num_sub_profiles                        u(8)
    for( i = 0; i < ptl_num_
    sub_profiles; i++ )
      general_sub_profile_idc[ i ]              u(32)
  }
  for( i = 0; i < maxNumSub-
  LayersMinus1; i++ )
    ptl_sublayer_level_
    present_flag[ i ]                           u(1)
  while( !byte_aligned( ) )
    ptl_alignment_zero_bit                      f(1)
  for( i = 0; i < maxNumSub-
  LayersMinus1; i++ )
    if( ptl_sublayer_level_
    present_flag[ i ] )
      sublayer_level_idc[ i ]                   u(8)
}
```

And the semantics are changed as follows:
*gci_present_flag equal to 1 specifies that the general_constraint_info() syntax* structure is present in *the profile_tier_level() syntax* structure when *profileTier* PresentFlag is equal to 1. *gci_present_flag equal to 0 specifies that the general_constraint_info() syntax structure* is not present in the *profile_tier_level() syntax* structure.
*The sematnics of the GCI fields in general_constraint_info()syntax structure apply when gci_present_flag is equal to 1. When gci_present_flag is equal to 0, the general_constraint_info() syntax structure does not impose any constraint.*
*ptl_alignment_zero_bit shall be equal to 0.*

FIG. 1 is a block diagram showing an example video processing system 1000 in which various techniques disclosed herein may be implemented. Various implementations may include some or all of the components of the system 1000. The system 1000 may include input 1002 for receiving video content. The video content may be received in a raw or uncompressed format, e.g., 8 or 10 bit multi-component pixel values, or may be in a compressed or encoded format. The input 1002 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1000 may include a coding component 1004 that may implement the various coding or encoding methods described in the present disclosure. The coding component 1004 may reduce the average bitrate of video from the input 1002 to the output of the coding component 1004 to produce a coded representation of the video. The coding techniques are therefore sometimes called video compression or video transcoding techniques. The output of the coding component 1004 may be either stored, or transmitted via a communication connected, as represented by the component 1006. The stored or communicated bitstream (or coded) representation of the video received at the input 1002 may be used by the component 1008 for generating pixel values or displayable video that is sent to a display interface 1010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 2:
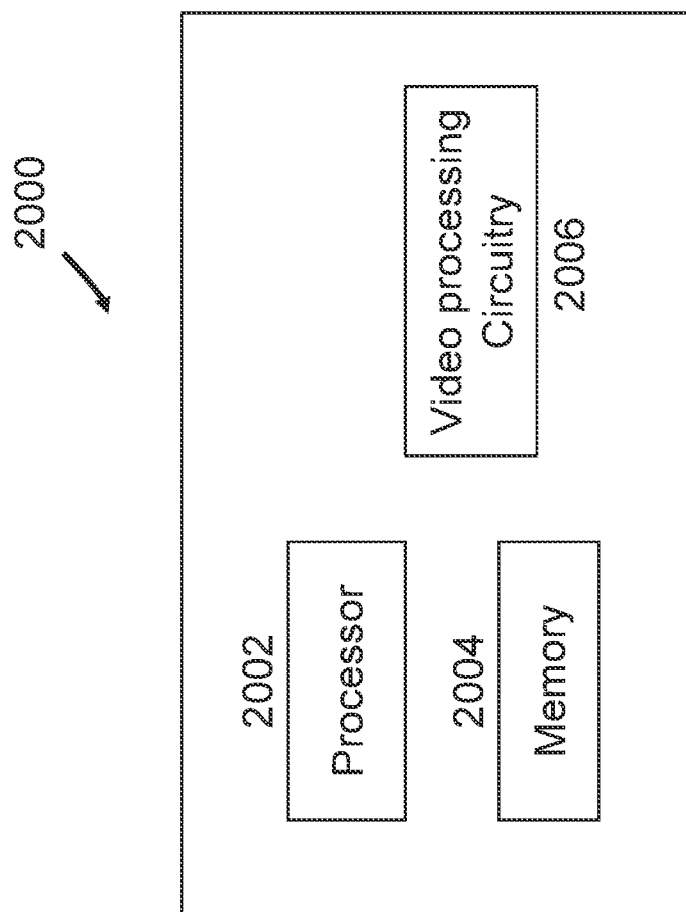
FIG. 2 is a block diagram of an example hardware platform used for video processing.

FIG. 2 is a block diagram of a video processing apparatus 2000. The apparatus 2000 may be used to implement one or more of the methods described herein. The apparatus 2000 may be embodied in a smartphone, tablet, computer, Internet of Things (IoT) receiver, and so on. The apparatus 2000 may include one or more processors 2002, one or more memories 2004 and video processing hardware 2006. The processor(s) 2002 may be configured to implement one or more methods described in the present disclosure (e.g., in FIGS. 6-9). The memory (memories) 2004 may be used for storing data and code used for implementing the methods and techniques described herein. The video processing hardware 2006 may be used to implement, in hardware circuitry, some techniques described in the present disclosure. In some embodiments, the hardware 2006 may be partly or entirely in the one or more processors 2002, e.g., a graphics processor.

Figure 3:
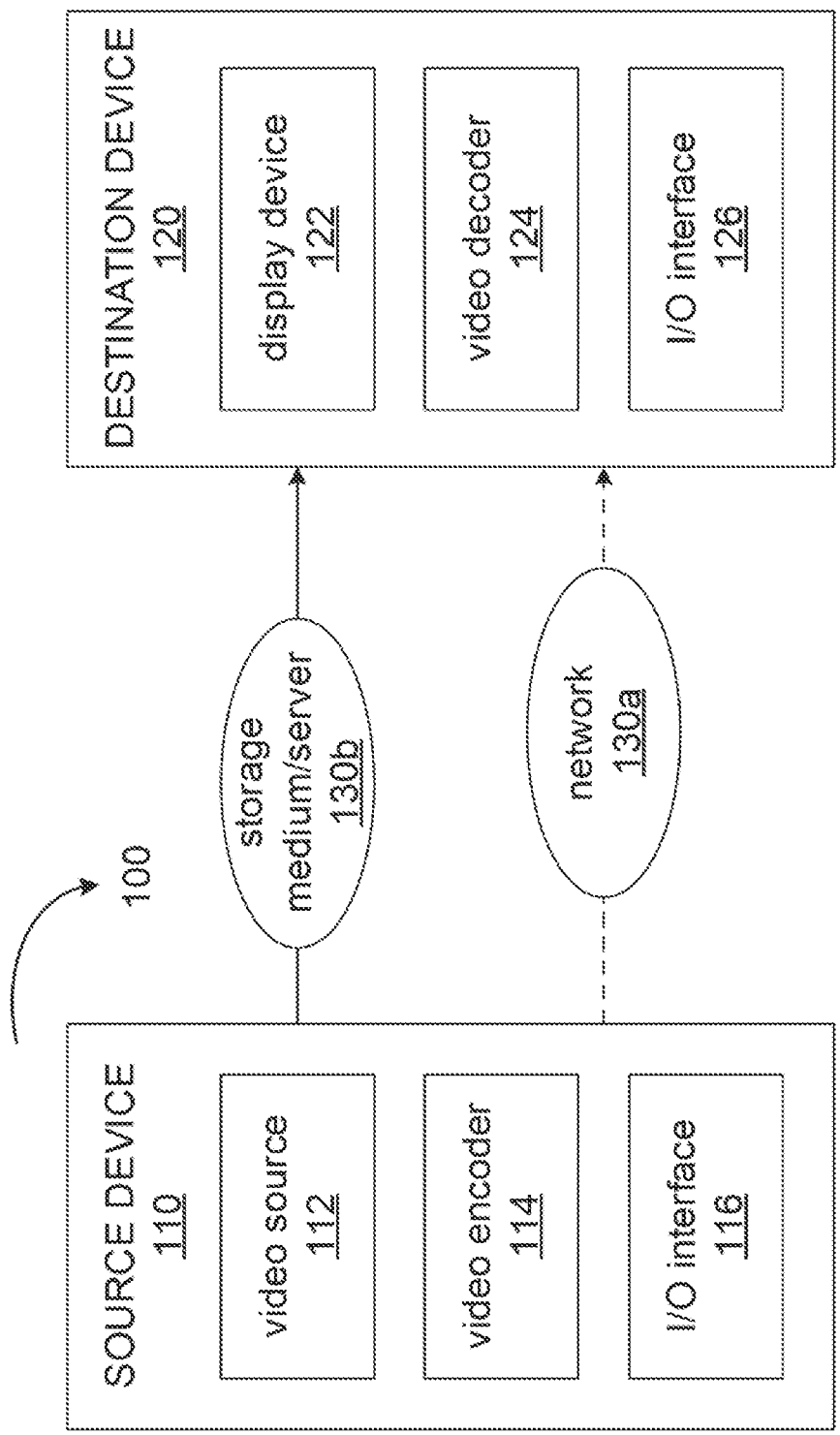
FIG. 3 is a block diagram that illustrates an example video coding system that can implement some embodiments of the present disclosure.

FIG. 3 is a block diagram that illustrates an example video coding system 100 that may utilize the techniques of this disclosure. As shown in FIG. 3, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources.

The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 4:
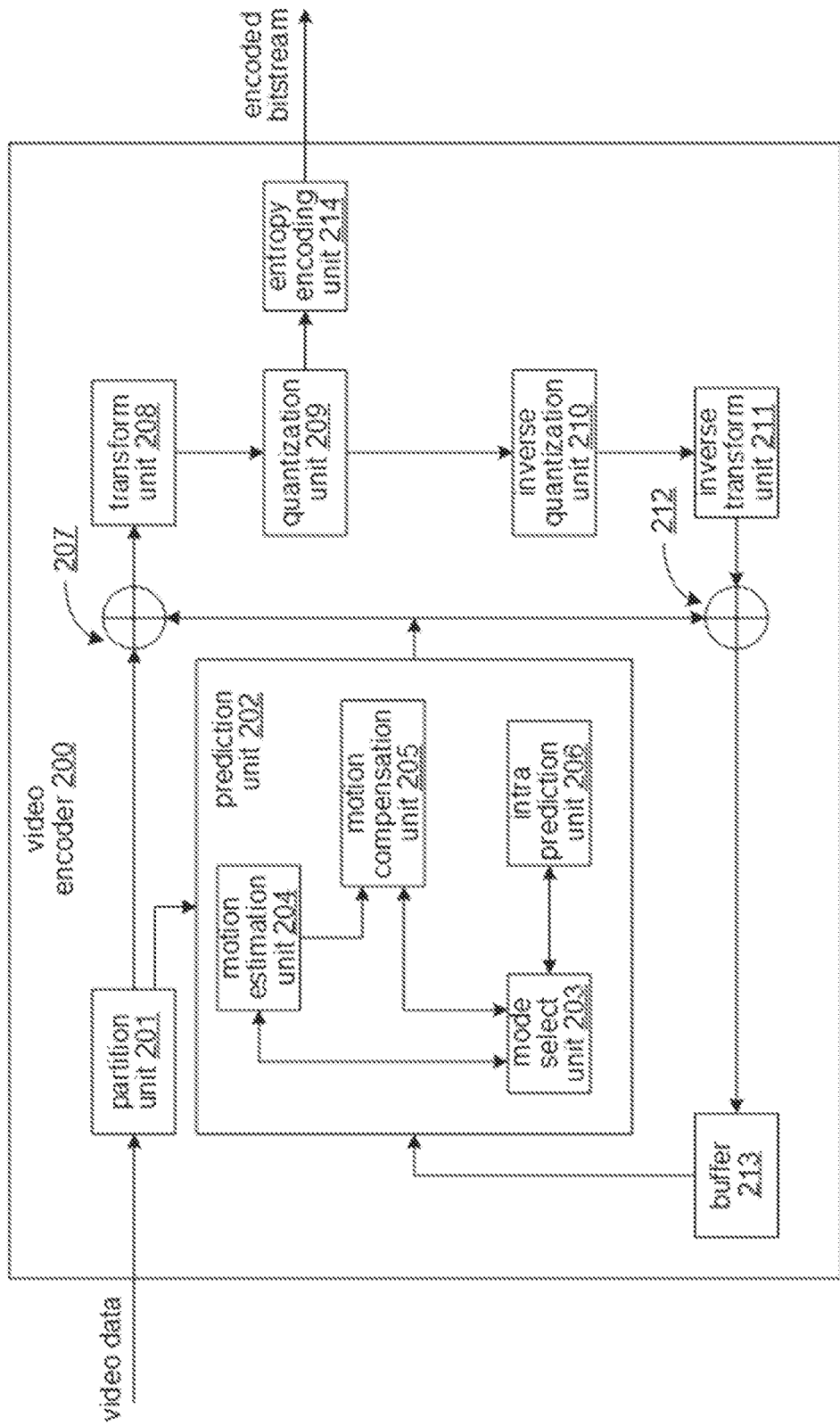
FIG. 4 is a block diagram that illustrates an example of an encoder that can implement some embodiments of the present disclosure.

FIG. 4 is a block diagram illustrating an example of video encoder 200, which may be video encoder 114 in the system 100 illustrated in FIG. 3.

Video encoder 200 may be configured to perform any or all of the techniques of this disclosure. In the example of FIG. 4, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy(IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 4 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 5:
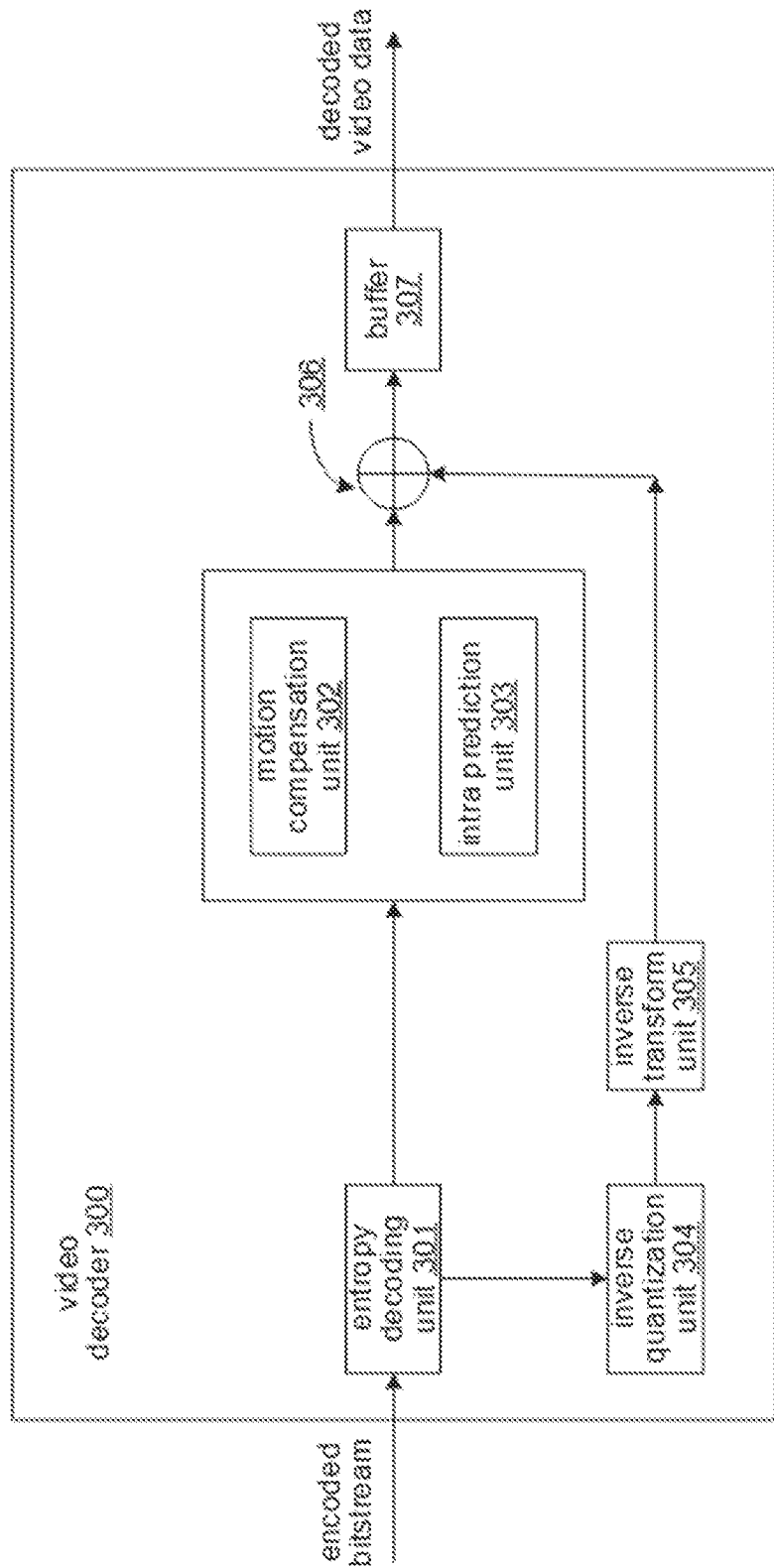
FIG. 5 is a block diagram that illustrates an example of a decoder that can implement some embodiments of the present disclosure.

FIG. 5 is a block diagram illustrating an example of video decoder 300 which may be video decoder 124 in the system 100 illustrated in FIG. 3.

The video decoder 300 may be configured to perform any or all of the techniques of this disclosure. In the example of FIG. 5, the video decoder 300 includes a plurality of functional components. The techniques described in this disclosure may be shared among the various components of the video decoder 300. In some examples, a processor may be configured to perform any or all of the techniques described in this disclosure.

In the example of FIG. 5, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 4).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

FIGS. 6-15 show example methods that can implement the technical solution described above in, for example, the embodiments shows in FIGS. 1-5.

Figure 6:
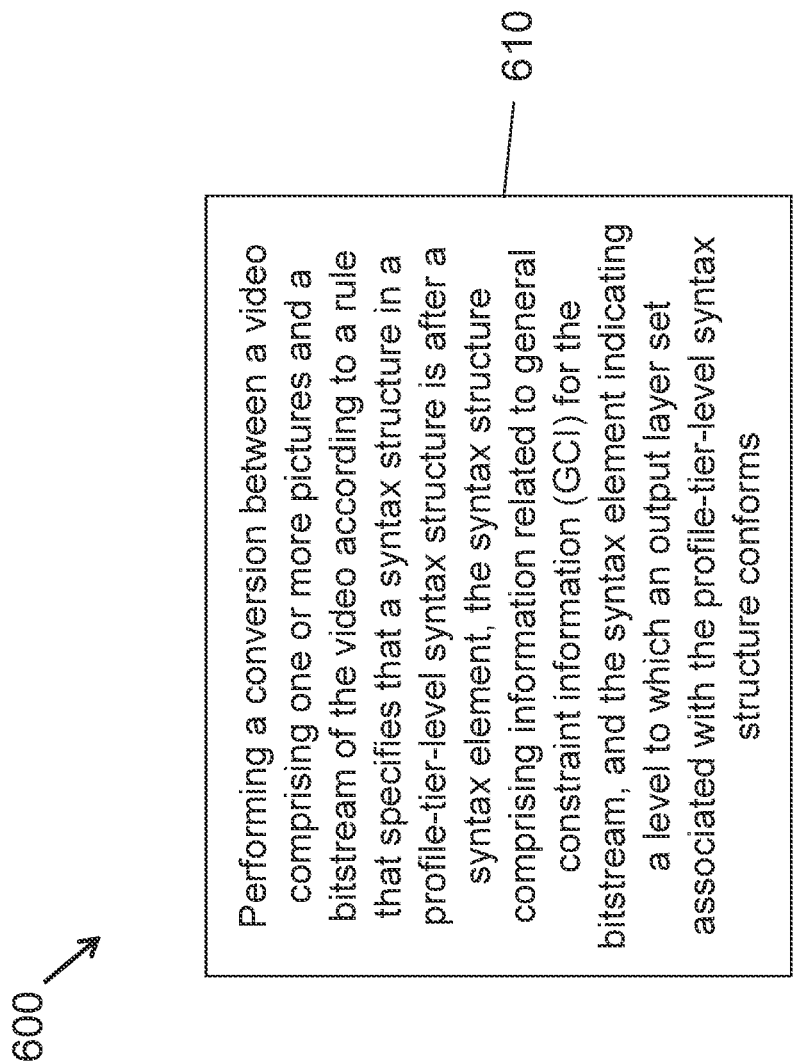
FIGS. 6-15 show flowcharts for example methods of video processing.

FIG. 6 shows a flowchart for an example method 600 of video processing. The method 600 includes, at operation 610, performing a conversion between a video comprising one or more pictures and a bitstream of the video according to a rule that specifies that a syntax structure in a profile-tier-level syntax structure is after a syntax element, the syntax structure comprising information related to general constraint information (GCI) for the bitstream, and the syntax element indicating a level to which an output layer set associated with the profile-tier-level syntax structure conforms.

Figure 7:
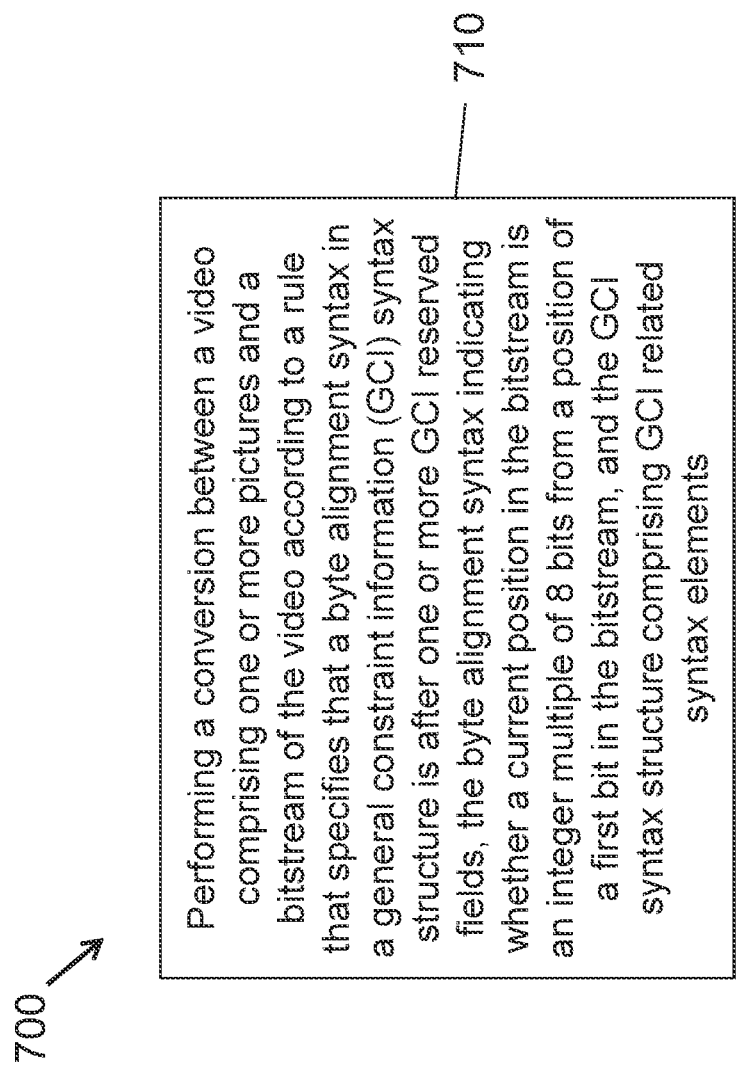

FIG. 7 shows a flowchart for an example method 700 of video processing. The method 700 includes, at operation 710, performing a conversion between a video comprising one or more pictures and a bitstream of the video according to a rule that specifies that a byte alignment syntax in a general constraint information (GCI) syntax structure is after one or more GCI reserved fields, the byte alignment syntax indicating whether a current position in the bitstream is an integer multiple of 8 bits from a position of a first bit in the bitstream, and the GCI syntax structure comprising GCI related syntax elements.

Figure 8:
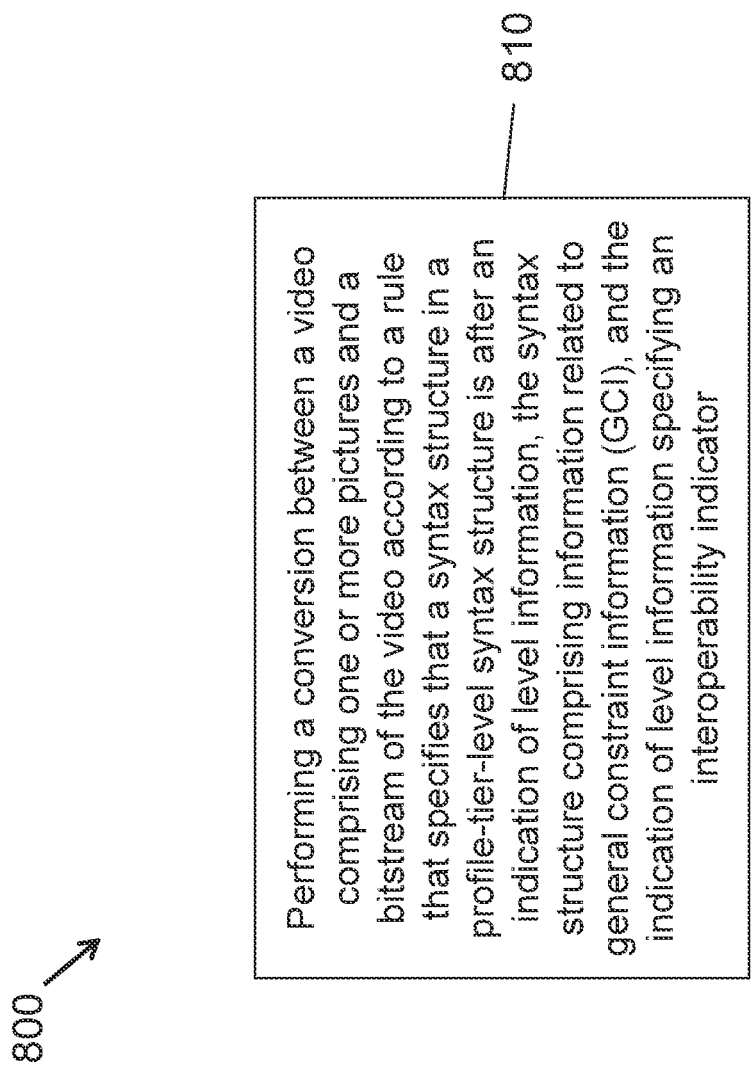

FIG. 8 shows a flowchart for an example method 800 of video processing. The method 800 includes, at operation 810, performing a conversion between a video comprising one or more pictures and a bitstream of the video according to a rule that specifies that a syntax structure in a profile-tier-level syntax structure is after an indication of level information, the syntax structure comprising information related to general constraint information (GCI), and the indication of level information specifying an interoperability indicator.

Figure 9:
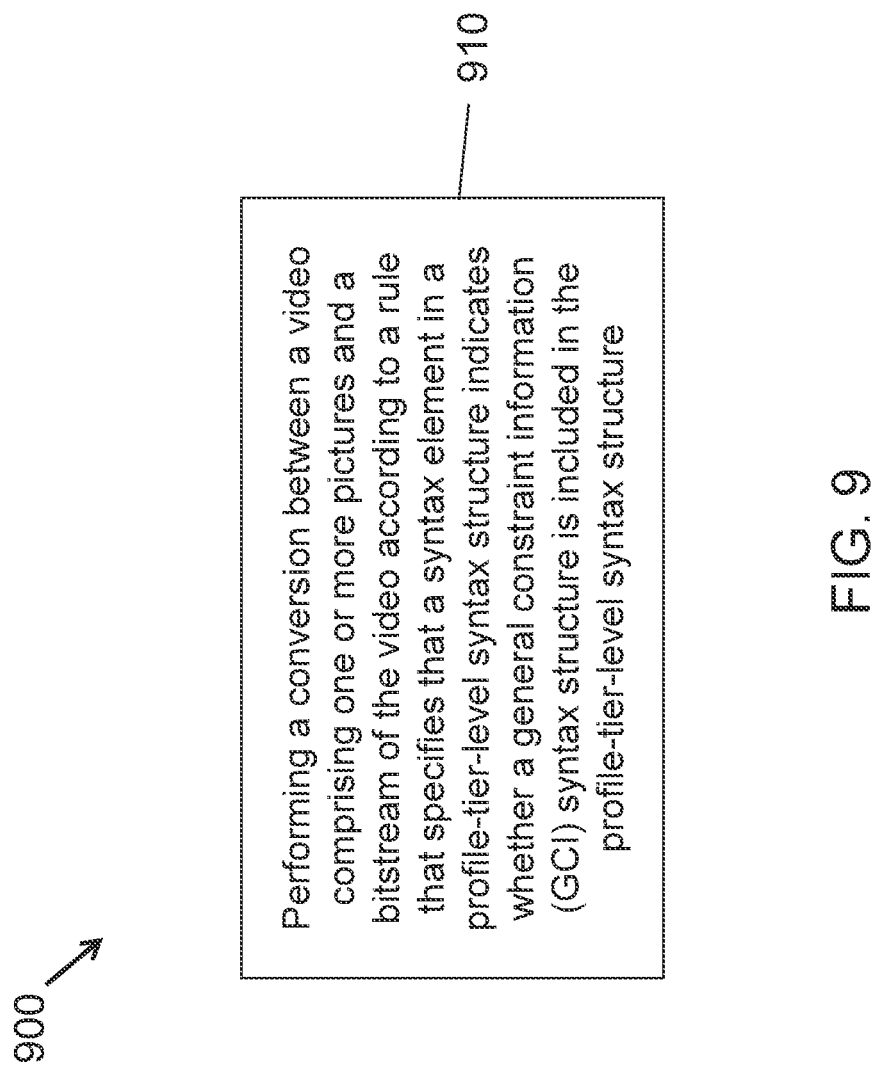

FIG. 9 shows a flowchart for an example method 900 of video processing. The method 900 includes, at operation 910, performing a conversion between a video comprising one or more pictures and a bitstream of the video according to a rule that specifies that a syntax element in a profile-tier-level syntax structure indicates whether a general constraint information (GCI) syntax structure is included in the profile-tier-level syntax structure.

Figure 10:
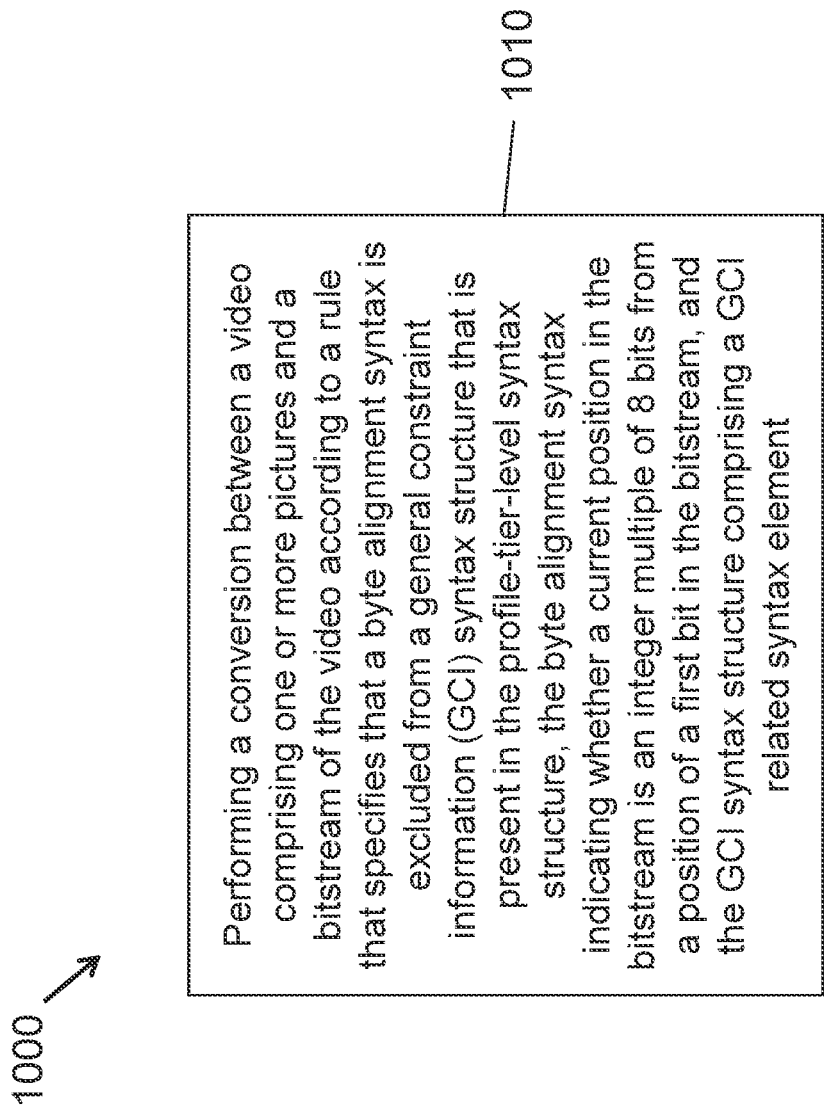

FIG. 10 shows a flowchart for an example method 1000 of video processing. The method 1000 includes, at operation 1010, performing a conversion between a video comprising one or more pictures and a bitstream of the video according to a rule that specifies that a byte alignment syntax is excluded from a general constraint information (GCI) syntax structure that is present in the profile-tier-level syntax structure, the byte alignment syntax indicating whether a current position in the bitstream is an integer multiple of 8 bits from a position of a first bit in the bitstream, and the GCI syntax structure comprising a GCI related syntax element.

Figure 11:
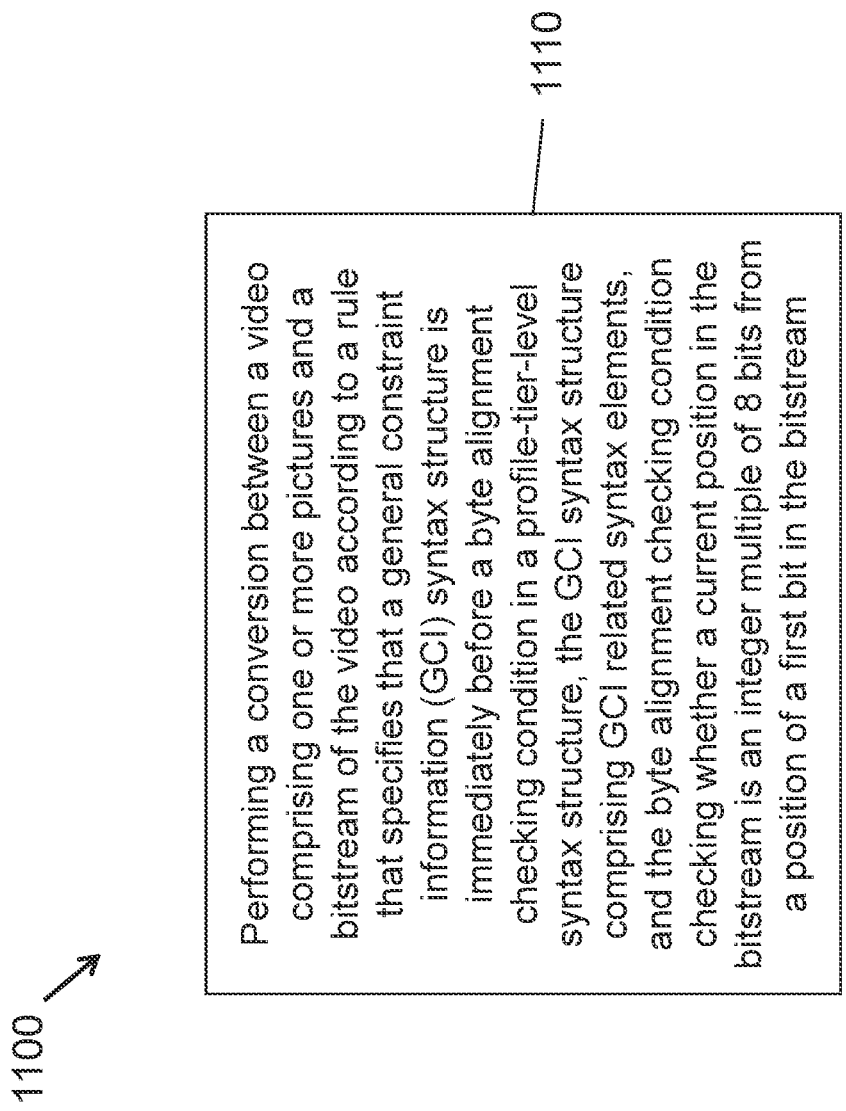

FIG. 11 shows a flowchart for an example method 1100 of video processing. The method 1100 includes, at operation 1110, performing a conversion between a video comprising one or more pictures and a bitstream of the video according to a rule that specifies that a general constraint information (GCI) syntax structure is immediately before a byte alignment checking condition in a profile-tier-level syntax structure, the GCI syntax structure comprising GCI related syntax elements, and the byte alignment checking condition checking whether a current position in the bitstream is an integer multiple of 8 bits from a position of a first bit in the bitstream.

Figure 12:
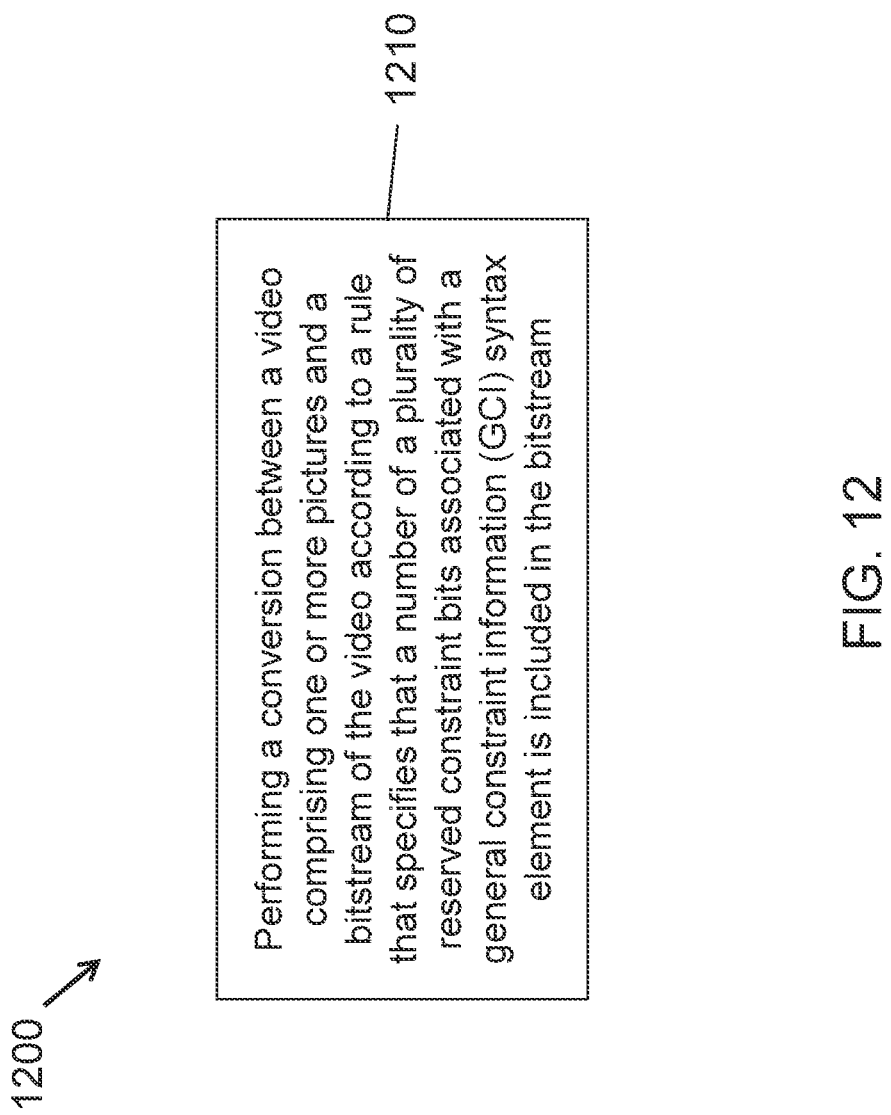

FIG. 12 shows a flowchart for an example method 1200 of video processing. The method 1200 includes, at operation 1210, performing a conversion between a video comprising one or more pictures and a bitstream of the video according to a rule that specifies that a number of a plurality of reserved constraint bits associated with a general constraint information (GCI) syntax element is included in the bitstream.

Figure 13:
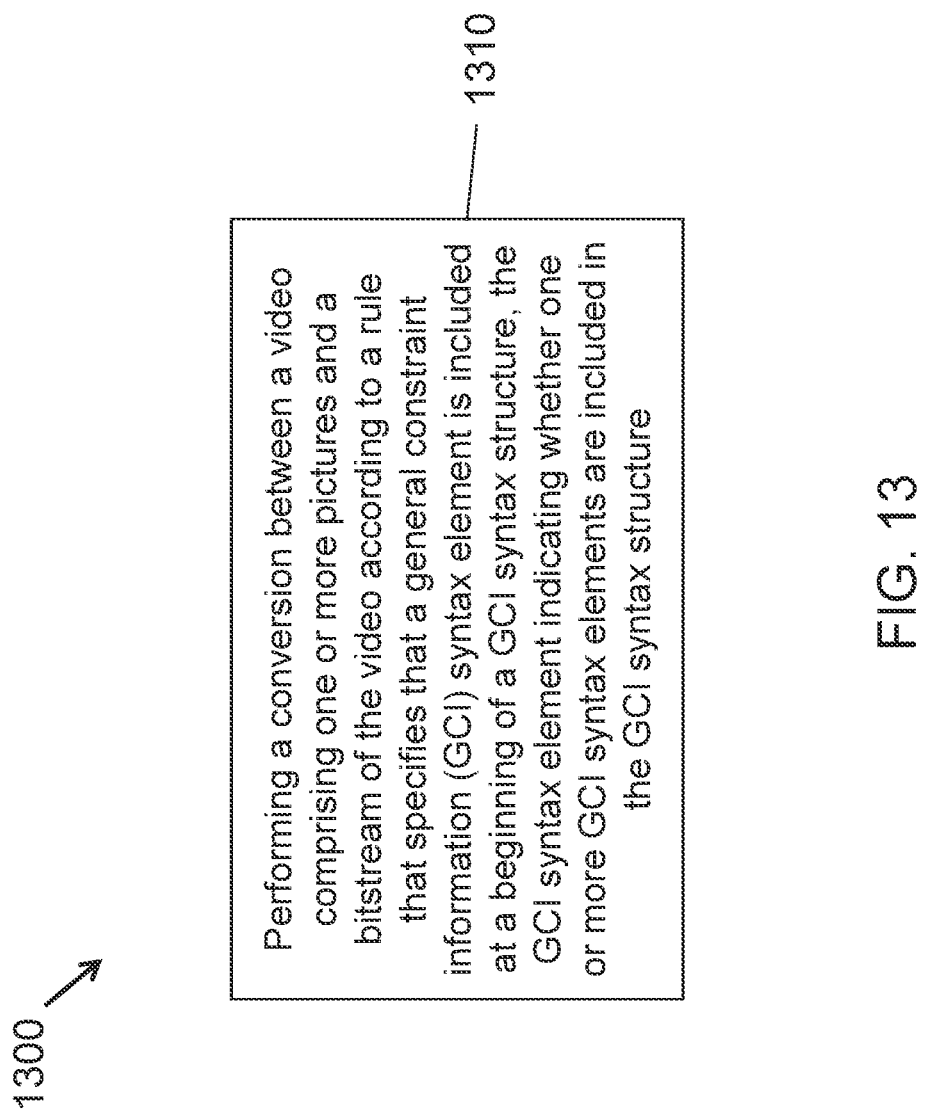

FIG. 13 shows a flowchart for an example method 1300 of video processing. The method 1300 includes, at operation 1310, performing a conversion between a video comprising one or more pictures and a bitstream of the video according to a rule that specifies that a general constraint information (GCI) syntax element is included at a beginning of a GCI syntax structure, the GCI syntax element indicating whether one or more GCI syntax elements are included in the GCI syntax structure.

Figure 14:
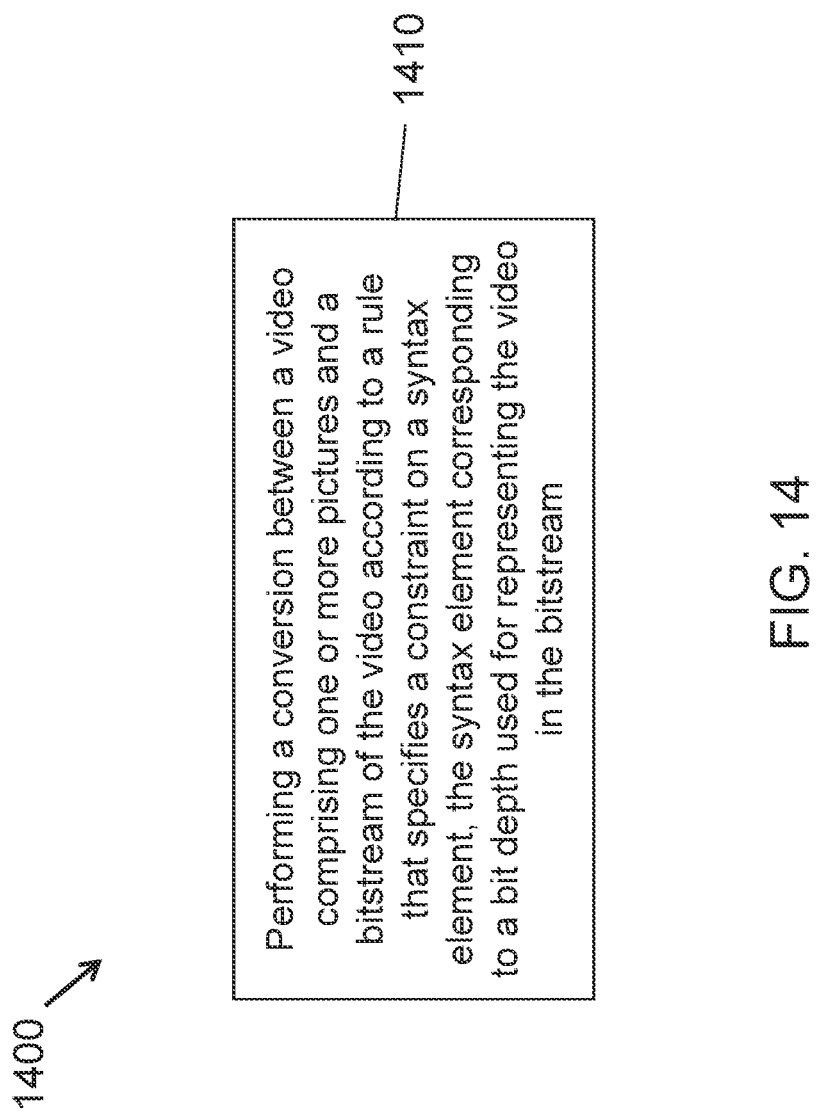

FIG. 14 shows a flowchart for an example method 1400 of video processing. The method 1400 includes, at operation 1410, performing a conversion between a video comprising one or more pictures and a bitstream of the video according to a rule that specifies a constraint on a syntax element, the syntax element corresponding to a bit depth used for representing the video in the bitstream.

Figure 15:
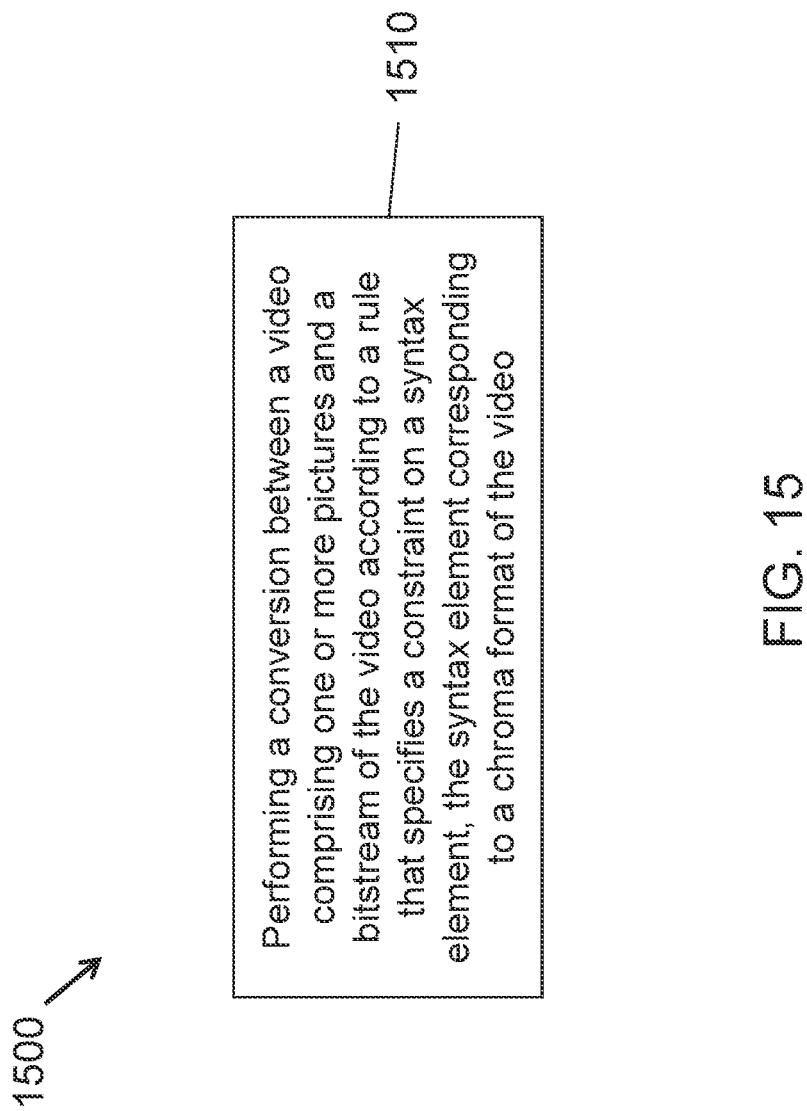

FIG. 15 shows a flowchart for an example method 1500 of video processing. The method 1500 includes, at operation 1510, performing a conversion between a video comprising one or more pictures and a bitstream of the video according to a rule that specifies a constraint on a syntax element, the syntax element corresponding to a chroma format of the video.

The following solutions show example embodiments of techniques discussed in the previous section (e.g., items 1-9).

A listing of solutions preferred by some embodiments is provided next.

A1. A method of video processing, comprising performing a conversion between a video comprising one or more pictures and a bitstream of the video according to a rule, wherein the rule specifies that a syntax structure in a profile-tier-level syntax structure is after a syntax element, wherein the syntax structure comprises information related to general constraint information (GCI) for the bitstream, and wherein the syntax element indicates a level to which an output layer set associated with the profile-tier-level syntax structure conforms.

A2. The method of solution A1, wherein the information related to the GCI indicates whether one or more GCI flags are indicated.

A3. The method of solution A1 or A2, wherein the syntax structure is immediately after the syntax element.

A4. The method of any of solutions A1 to A3, wherein the syntax structure is a general_constraint_info( ) syntax structure and the syntax element is a general_level_idc syntax element.

A5. A method of video processing, comprising performing a conversion between a video comprising one or more pictures and a bitstream of the video according to a rule, wherein the rule specifies that a byte alignment syntax in a general constraint information (GCI) syntax structure is after one or more GCI reserved fields, wherein the byte alignment syntax indicates whether a current position in the bitstream is an integer multiple of 8 bits from a position of a first bit in the bitstream, and wherein the GCI syntax structure comprises GCI related syntax elements.

A6. The method of solution A5, wherein the byte alignment syntax is at an end of the GCI syntax structure.

A7. The method of solution A5 or A6, wherein the byte alignment syntax comprises a gci_alignment_zero_bit field and its syntax condition, and the GCI syntax structure is a general_constraint_info( ) syntax structure.

A8. A method of video processing, comprising performing a conversion between a video comprising one or more pictures and a bitstream of the video according to a rule, wherein the rule specifies that a syntax structure in a profile-tier-level syntax structure is after an indication of level information, wherein the syntax structure comprises information related to general constraint information (GCI), and wherein the indication of level information specifies an interoperability indicator.

A9. The method of solution A8, wherein the syntax structure is a general_constraint_info( ) syntax structure and the indication is a general_sub_profile_idc[i] syntax element.

A10. A method of video processing, comprising performing a conversion between a video comprising one or more pictures and a bitstream of the video according to a rule, wherein rule specifies that a syntax element in a profile-tier-level syntax structure indicates whether a general constraint information (GCI) syntax structure is included in the profile-tier-level syntax structure.

A11. The method of solution A10, wherein the syntax element is a first flag.

A12. The method of solution A11, wherein the first flag equaling one and a second flag equaling one indicates that the GCI syntax structure is present in the profile-tier-level syntax structure.

A13. The method of solution A12, wherein the second flag is profileTierPresentFlag.

A14. The method of solution A11, wherein the first flag equaling zero indicates that the GCI syntax structure is not present in the profile-tier-level syntax structure.

A15. The method of solution A11, wherein the GCI syntax structure comprises one or more GCI fields, and wherein semantics of the one or more GCI fields only apply when the first flag is equal to one.

A16. The method of solution A11, wherein an inclusion of the first flag in the profile-tier-level syntax structure is based on a value of a second flag.

A17. The method of solution A16, wherein the second flag is profileTierPresentFlag.

A18. The method of any of solutions A11 to A17, wherein the first flag is gci_present_flag.

A19. A method of video processing, comprising performing a conversion between a video comprising one or more pictures and a bitstream of the video according to a rule, wherein the rule specifies that a byte alignment syntax is excluded from a general constraint information (GCI) syntax structure that is present in the profile-tier-level syntax structure, wherein the byte alignment syntax indicates whether a current position in the bitstream is an integer multiple of 8 bits from a position of a first bit in the bitstream, and wherein the GCI syntax structure comprises a GCI related syntax element.

A20. The method of solution A19, wherein the byte alignment syntax comprises a gci_alignment_zero_bit field and its syntax condition, and the GCI syntax structure is a general_constraint_info( ) syntax structure.

A21. The method of solution A19, wherein the rule further specifies that a number of a plurality of reserved constraint bits associated with the GCI related syntax element is included in the bitstream.

A22. The method of solution A21, wherein the rule further specifies that a value of each of the plurality of reserved constraint bits is included in the bitstream.

A23. The method of solution A22, wherein the GCI syntax element is gci_num_reserved_bits.

A24. The method of solution A22, wherein the syntax element is coded as an unsigned 11-bit integer.

A25. The method of solution A22, wherein the value of each of the plurality of reserved constraint bits is coded as an unsigned 1-bit integer.

A26. A method of video processing, comprising performing a conversion between a video comprising one or more pictures and a bitstream of the video according to a rule, wherein the rule specifies that a general constraint information (GCI) syntax structure is immediately before a byte alignment checking condition in a profile-tier-level syntax structure, wherein the GCI syntax structure comprises GCI related syntax elements, and wherein the byte alignment checking condition checks whether a current position in the bitstream is an integer multiple of 8 bits from a position of a first bit in the bitstream.

A27. The method of solution A26, wherein the GCI syntax structure is a general_constraint_info( ) syntax structure, and wherein the byte alignment checking condition is based on a byte aligned( ) syntax element.

A28. The method of any of solutions A1 to A27, wherein the conversion comprises decoding the video from the bitstream.

A29. The method of any of solutions A1 to A27, wherein the conversion comprises encoding the video into the bitstream.

A30. A method of storing a bitstream representing a video to a computer-readable recording medium, comprising generating the bitstream from the video according to a method described in any one or more of solutions A1 to A27; and storing the bitstream in the computer-readable recording medium.

A31. A video processing apparatus comprising a processor configured to implement a method recited in any one or more of solutions A1 to A30.

A32. A computer-readable medium having instructions stored thereon, the instructions, when executed, causing a processor to implement a method recited in one or more of solutions A1 to A30.

A33. A computer readable medium that stores the bitstream generated according to any one or more of solutions A1 to A30.

A34. A video processing apparatus for storing a bitstream, wherein the video processing apparatus is configured to implement a method recited in any one or more of solutions A1 to A30.

Another listing of solutions preferred by some embodiments is provided next.

B1. A method of video processing, comprising performing a conversion between a video comprising one or more pictures and a bitstream of the video according to a rule, wherein the rule specifies that a number of a plurality of reserved constraint bits associated with a general constraint information (GCI) syntax element is included in the bitstream.

B2. The method of solution B1, wherein the rule further specifies that a value of each of the plurality of reserved constraint bits is included in the bitstream.

B3. The method of solution B2, wherein the syntax element is coded as an unsigned 11-bit integer.

B4. The method of solution B2, wherein the value of each of the plurality of reserved constraint bits is coded as an unsigned 1-bit integer.

B5. The method of solution B2, wherein the GCI syntax element is gci_num_reserved_bits.

B6. A method of video processing, comprising performing a conversion between a video comprising one or more pictures and a bitstream of the video according to a rule, wherein the rule specifies that a general constraint information (GCI) syntax element is included at a beginning of a GCI syntax structure, wherein the GCI syntax element indicates whether one or more GCI syntax elements are included in the GCI syntax structure.

B7. The method of solution B6, wherein the GCI syntax element equaling zero indicates that the one or more GCI syntax elements are not included in the GCI syntax structure.

B8. The method of solution B7, wherein the one or more GCI syntax elements exclude a byte alignment field.

B9. The method of solution B7, wherein the GCI syntax structure does not impose a constraint.

B10. The method of solution B6, wherein a second syntax element is after the GCI syntax structure, wherein the second syntax element specifies a number of syntax elements, each of which specifies an interoperability indicator.

B11. The method of solution B10, wherein the second syntax element is immediately after the GCI syntax structure.

B12. The method of solution B10 or B11, wherein a byte alignment check for the second syntax element is added in response to the second syntax element being present in the bitstream.

B13. The method of solution B12, wherein one or more alignment bits are added in response to the second syntax element not being byte-aligned, and wherein adding the one or more alignment bits causes the second syntax element to be byte-aligned.

B14. The method of solution B13, wherein the one or more alignment bits comprise one or more ptl_alignment_zero_bit.

B15. The method of any of solutions B10 to B14, wherein the second syntax element is ptl_num_sub_profiles.

B16. The method of solution B6, wherein the GCI syntax element equaling one indicates that the one or more GCI syntax elements are included in the GCI syntax structure.

B17. The method of any of solutions B6 to B16, wherein the first GCI syntax element is gci_present_flag and the GCI syntax structure is a general_constraint_info( ) syntax structure.

B18. A method of video processing, comprising performing a conversion between a video comprising one or more pictures and a bitstream of the video according to a rule, wherein the rule specifies a constraint on a syntax element, wherein the syntax element corresponds to a bit depth used for representing the video in the bitstream.

B19. The method of solution B18, wherein the constraint specifies that the syntax element is a non-negative integer less than a maximum value that equals a value of the syntax element plus one.

B20. The method of solution B19, wherein the syntax element being less than 8 imposes the constraint.

B21. The method of solution B19, wherein the syntax element being greater than or equal to 8 does not impose the constraint.

B22. The method of any of solutions B18 to B21, wherein the syntax element is max_bitdepth_minus8_constraint_idc.

B23. A method of video processing, comprising performing a conversion between a video comprising one or more pictures and a bitstream of the video according to a rule, wherein the rule specifies a constraint on a syntax element, wherein the syntax element corresponds to a chroma format of the video.

B24. The method of solution B23, wherein the constraint specifies that the syntax element is a non-negative integer less than a maximum value that equals a value of the syntax element plus one.

B25. The method of solution B24, wherein the syntax element being less than 2 imposes the constraint.

B26. The method of solution B24, wherein the syntax element being equal to 2 does not impose the constraint.

B27. The method of any of solutions B23 to B26, wherein the syntax element is max_chroma_format_constraint_idc.

B28. The method of any of solutions B1 to B27, wherein the conversion comprises decoding the video from the bitstream.

B29. The method of any of solutions B1 to B27, wherein the conversion comprises encoding the video into the bitstream.

B30. A method of storing a bitstream representing a video to a computer-readable recording medium, comprising generating the bitstream from the video according to a method described in any one or more of solutions B1 to B27; and storing the bitstream in the computer-readable recording medium.

B31. A video processing apparatus comprising a processor configured to implement a method recited in any one or more of solutions B1 to B30.

B32. A computer-readable medium having instructions stored thereon, the instructions, when executed, causing a processor to implement a method recited in one or more of solutions B1 to B30.

B33. A computer readable medium that stores the bitstream generated according to any one or more of solutions B1 to B30.

B34. A video processing apparatus for storing a bitstream, wherein the video processing apparatus is configured to implement a method recited in any one or more of solutions B1 to B30.

Yet another listing of solutions preferred by some embodiments is provided next.

P1. A video processing method, comprising performing a conversion between a video and a coded representation of the video, wherein the coded representation conforms to a format rule, wherein the format rule specifies where and how a general constraint information syntax (GCI) field is included in the coded representation, or a condition under which the GCI field is included in the coded representation.

P2. The method of solution P1, wherein, the rule specifies that the GCI field is included after an indication of a level information for the video.

P3. The method of any of solutions P1 to P2, wherein, the rule specifies to include the GCI field after a field indicating whether the GCI field is included in the coded representation.

P4. The method of solution P1, wherein the rule specifies that the GCI field is included after a tier indication flag and before a byte alignment syntax element in a profile-tier-level syntax structure.

P5. The method of any of solutions P1 to P4, wherein the rule further specifies that the coded representation includes a number of constraint bits or a value of each reserved constrain instead of signaling a total number of reserved constraint bytes.

P6. A video processing method, comprising performing a conversion between a video and a coded representation of the video, wherein the coded representation conforms to a format rule, wherein the format rule specifies a constraint on a syntax element, wherein the syntax element corresponds to a bit depth used for representing the video in the coded representation or a constrain of a chroma format of the video.

P7. The method of solution P6, wherein the format rule specifies a constraint for a value of the field that is less than 8.

P8. The method of solution P6, wherein the format rule specifies that the constraint is not imposed for a value 2 of the syntax element.

P9. The method of any of solutions P1 to P8, wherein the performing the conversion comprises encoding the video to generate the coded representation.

P10. The method of any of solutions P1 to P8, wherein the performing the conversion comprises parsing and decoding the coded representation to generate the video.

P11. A video decoding apparatus comprising a processor configured to implement a method recited in one or more of solutions P1 to P10.

P12. A video encoding apparatus comprising a processor configured to implement a method recited in one or more of solutions P1 to P10.

P13. A computer program product having computer code stored thereon, the code, when executed by a processor, causes the processor to implement a method recited in any of solutions P1 to P10.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation (or simply, the bitstream) of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of video processing, comprising:
performing a conversion between a video comprising one or more pictures and a bitstream of the video according to a first rule,
wherein the first rule specifies that a general constraint information (GCI) syntax structure in a profile-tier-level syntax structure is after a syntax element,
wherein the syntax structure comprises information related to general constraint information (GCI) for the bitstream,
wherein the syntax element indicates a level to which one or more output layer sets conform,
wherein the conversion is performed further according to a second rule, and
wherein the second rule specifies that a byte alignment syntax in the GCI syntax structure is after one or more GCI reserved fields.

2. The method of claim 1, wherein the information related to the GCI indicates whether one or more GCI flags are indicated, and/or one or more values of one or more GCI flags.

3. The method of claim 1, wherein the GCI syntax structure is a general_constraint_info( )syntax structure and the syntax element is a general_level_idc syntax element.

4. The method of claim 1, wherein the byte alignment syntax indicates whether a current position in the bitstream is an integer multiple of 8 bits from a position of a first bit in the bitstream.

5. The method of claim 1, wherein the byte alignment syntax is at an end of the GCI syntax structure.

6. The method of claim 1, wherein the byte alignment syntax comprises a gci_alignment_zero_bit field and its syntax condition, and the GCI syntax structure is a general_constraint_info( ) syntax structure.

7. The method of claim 1, wherein the conversion is performed further according to a third rule;
wherein the third rule specifies that a first GCI syntax element indicating a number of reserved GCI bits is included in the bitstream.

8. The method of claim 7, wherein the third rule further specifies that a value of each of the reserved GCI bits is included in the bitstream.

9. The method of claim 8, wherein the value of each of the reserved GCI bits is coded as an unsigned 1-bit integer.

10. The method of claim 7, wherein the first GCI syntax element is gci_num_reserved_bits.

11. The method of claim 1, wherein the conversion is performed further according to a fourth rule,
wherein the fourth rule specifies that a second GCI syntax element is included at a beginning of the GCI syntax structure,
wherein the second GCI syntax element indicates whether one or more GCI syntax elements are included in the GCI syntax structure.

12. The method of claim 11, wherein the second GCI syntax element equaling zero indicates that the one or more GCI syntax elements are not included in the GCI syntax structure.

13. The method of claim 12, wherein the one or more GCI syntax elements exclude a byte alignment field.

14. The method of claim 12, wherein the GCI syntax structure does not impose a constraint.

15. An apparatus for processing video data comprising a processor and a non-transitory memory with instructions thereon, wherein the instructions upon execution by the processor, cause the processor to:
perform a conversion between a video comprising one or more pictures and a bitstream of the video according to a first rule,
wherein the first rule specifies that a general constraint information (GCI) syntax structure in a profile-tier-level syntax structure is after a syntax element,
wherein the syntax structure comprises information related to general constraint information (GCI) for the bitstream,
wherein the syntax element indicates a level to which one or more output layer sets conform,
wherein the conversion is performed further according to a second rule, and
wherein the second rule specifies that a byte alignment syntax in the GCI syntax structure is after one or more GCI reserved fields.

16. The apparatus of claim 15, wherein the information related to the GCI indicates whether one or more GCI flags are indicated, and/or one or more values of one or more GCI flags.

17. The apparatus of claim 16, wherein the conversion is performed according to a third rule or a fourth rule,
wherein the third rule specifies that a first GCI syntax element indicating a number of reserved GCI bits is included in the bitstream, or
wherein the fourth rule specifies that a second GCI syntax element is included at a beginning of the GCI syntax structure, wherein the second GCI syntax element indicates whether one or more GCI syntax elements are included in the GCI syntax structure.

18. The apparatus of claim 17, wherein the first GCI syntax element is gci_num_reserved_bits.

19. A non-transitory computer-readable storage medium storing instructions that cause a processor to:
perform a conversion between a video comprising one or more pictures and a bitstream of the video according to a first rule,
wherein the first rule specifies that a general constraint information (GCI) syntax structure in a profile-tier-level syntax structure is after a syntax element,
wherein the syntax structure comprises information related to general constraint information (GCI) for the bitstream,
wherein the syntax element indicates a level to which one or more output layer sets conform,
wherein the conversion is performed further according to a second rule, and
wherein the second rule specifies that a byte alignment syntax in the GCI syntax structure is after one or more GCI reserved fields.

20. A non-transitory computer-readable recording medium storing a bitstream of a video which is generated by a method performed by a video processing apparatus, wherein the method comprises:
- generating the bitstream of the video comprising one or more pictures according to a first rule,
- wherein the first rule specifies that a general constraint information (GCI) syntax structure in a profile-tier-level syntax structure is after a syntax element,
- wherein the syntax structure comprises information related to general constraint information (GCI) for the bitstream, and
- wherein the syntax element indicates a level to which one or more output layer sets conform,
- wherein the bitstream is further generated according to a second rule;
- wherein the second rule specifies that a byte alignment syntax in the GCI syntax structure is after one or more GCI reserved fields.

* * * * *